United States Patent
Dou et al.

(10) Patent No.: US 12,443,727 B2
(45) Date of Patent: Oct. 14, 2025

(54) MICROPROCESSOR, DATA PROCESSING METHOD, ELECTRONIC DEVICE, AND STORAGE MEDIUM

(71) Applicant: Phytium Technology Co., Ltd., Tianjin (CN)

(72) Inventors: Qiang Dou, Tianjin (CN); Yanzhao Feng, Tianjin (CN); Yufeng Guo, Tianjin (CN); Ming Zhang, Tianjin (CN); Zhuo Ma, Tianjin (CN); Qingshan Zhu, Tianjin (CN); Zhiqiang Chen, Tianjin (CN)

(73) Assignee: Phytium Technology Co., Ltd., Tianjin (CN)

( * ) Notice: Subject to any disclaimer, the term of this patent is extended or adjusted under 35 U.S.C. 154(b) by 295 days.

(21) Appl. No.: 17/889,664

(22) Filed: Aug. 17, 2022

(65) Prior Publication Data

US 2023/0068658 A1    Mar. 2, 2023

(30) Foreign Application Priority Data

Sep. 1, 2021    (CN) .......................... 202111017731.3

(51) Int. Cl.
  *G06F 21/60* (2013.01)
  *G06F 9/48* (2006.01)
  *G06F 21/72* (2013.01)

(52) U.S. Cl.
  CPC .......... *G06F 21/602* (2013.01); *G06F 9/4881* (2013.01); *G06F 21/72* (2013.01)

(58) Field of Classification Search
  CPC ........ G06F 21/602; G06F 21/72; G06F 21/53; G06F 21/57; G06F 21/604; G06F 21/74;
  (Continued)

(56) References Cited

U.S. PATENT DOCUMENTS 6,148,342 A * 11/2000 Ho ...................... G06F 21/6245
                                                    709/225
10,043,229 B2 * 8/2018 Hanna ................. H04L 63/0861
(Continued)

FOREIGN PATENT DOCUMENTS

CN    107743133 A    2/2018
CN    110543764 A    12/2019
DE    102013006470 A1    10/2014

*Primary Examiner* — Richard G Keehn
(74) *Attorney, Agent, or Firm* — ANOVA LAW GROUP, PLLC

(57) ABSTRACT

A microprocessor includes a cryptographic engine and a controller. The cryptographic engine is configured to execute a cryptographic algorithm. The controller is connected to the cryptographic engine. The controller is configured to receive an access request from a first execution environment. The access request accesses the cryptographic engine to execute the cryptographic algorithm. The access request includes at least identification information. The identification information indicates that the access request is from the first execution environment. The first execution environment is an execution environment of a number N execution environments. N is an integer greater than or equal to 1. The controller is further configured to, based on the identification information, instruct the cryptographic engine to execute the cryptographic algorithm that needs to be executed required by the access request.

20 Claims, 6 Drawing Sheets

(58) Field of Classification Search
CPC ........... G06F 9/4881; G06F 2221/2105; G06F 2221/2141
See application file for complete search history.

(56) References Cited

U.S. PATENT DOCUMENTS

2017/0201503 A1\* 7/2017 Jayasena ............. H04L 63/0876
2019/0319789 A1\* 10/2019 Chhabra ................ G06F 21/78

\* cited by examiner

MICROPROCESSOR, DATA PROCESSING METHOD, ELECTRONIC DEVICE, AND STORAGE MEDIUM

CROSS-REFERENCES TO RELATED APPLICATION

This application claims priority to Chinese Application No. 202111017731.3 filed on Sep. 1, 2021, the entire content of which is incorporated herein by reference.

TECHNICAL FIELD

The present disclosure generally relates to the integrated circuit field and, more particularly, to a microprocessor, a data processing method, an electronic device, and a storage medium.

BACKGROUND

As security requirements imposed by computer systems are increasing, more and more security technologies are being applied to various computer systems. Cryptography and trusted execution environment (TEE) technology have become an important part of a security system. A cryptographic operation is an essential part of the security system. As a part of the security system or a secure computer system, a cryptographic acceleration engine is used to perform the cryptographic operation to improve the efficiency and performance of the cryptographic operation. In the security system, cryptography is used to prevent an attacker from obtaining important data, faking identity, or modifying a document. Most processors support TEE and a rich execution environment (REE). TEE is used to execute a trusted program with a specific function. REE is used to execute a normal program with rich functions. TEE can provide various security services for REE. Generally, an application in REE has a relatively low-security requirement. An application in TEE has a relatively high-security requirement. Cooperation between TEE and the environment can form a computer system that is relatively safe and has rich functions.

Thus, it is desired to establish a secure computer system.

SUMMARY

Embodiments of the present disclosure provide a microprocessor, including a cryptographic engine and a controller. The cryptographic engine is configured to execute a cryptographic algorithm. The controller is connected to the cryptographic engine. The controller is configured to receive an access request from a first execution environment and, based on the identification information, instruct the cryptographic engine to execute the cryptographic algorithm that needs to be executed required by the access request. The access request accesses the cryptographic engine to execute the cryptographic algorithm. The access request includes at least identification information. The identification information indicates that the access request is from the first execution environment. The first execution environment is an execution environment of a number N execution environments. N is an integer greater than or equal to 1.

Embodiments of the present disclosure provide a data processing method that is applied to a microprocessor. The method includes receiving an access request from a first execution environment and, based on the identification information, instructing the cryptographic engine to execute the cryptographic algorithm that needs to be executed required by the access request. The access request accesses a cryptographic engine to execute a cryptographic algorithm. The access request includes at least identification information. The identification information indicates that the access request is from the first execution environment. The first execution environment is an execution environment of a number N execution environments. N is an integer greater than or equal to 1.

Embodiments of the present disclosure provide an electronic device, including a memory and a processor. The memory stores an instruction. The processor is coupled with the memory and, when the instruction being executed, configured to receive an access request from a first execution environment and, based on the identification information, instruct the cryptographic engine to execute the cryptographic algorithm that needs to be executed required by the access request. The access request includes at least identification information. The identification information indicates that the access request is from the first execution environment. The first execution environment is an execution environment of a number N execution environments. N is an integer greater than or equal to 1.

BRIEF DESCRIPTION OF THE DRAWINGS

To more clearly illustrate the technical solutions in the embodiments of the present disclosure, the drawings used in the description of the embodiments will be briefly described below. It is obvious that the drawings in the following description are only some embodiments of the present disclosure. For those having ordinary skills in the art, other drawings can be obtained according to these drawings without inventive efforts. It should be noted that similar reference numerals and letters denote similar items in the accompanying drawings, and therefore, once an item is defined in a drawing, an item may not be defined or explained again in subsequent figures.

DETAILED DESCRIPTION OF THE EMBODIMENTS

Figure 1:
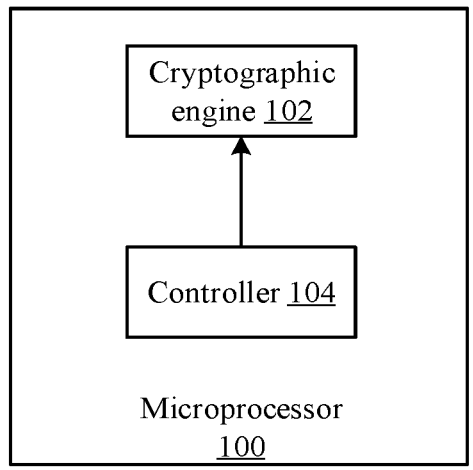
FIG. 1 is a schematic diagram of a microprocessor according to some embodiments of the present disclosure.

According to embodiments of the present disclosure, examples of the present disclosure are shown in the accompanying drawings. Although the present disclosure will be described in connection with embodiments of the present disclosure, the present disclosure is not intended to be limited to described embodiments. On the contrary, embodiments of the present disclosure are intended to cover changes, modifications, and equivalents included within the spirit and scope of the disclosure as defined by the appended claims. Method operations described in the specification are implemented by any functional block or functional arrangement. Any functional block or functional arrangement may be implemented as a physical entity, a logical entity, or a combination thereof.

In order to enable those skilled in the art to better understand the present disclosure, the present disclosure will be further described in detail below with reference to the accompanying drawings and specific embodiments.

The examples to be described next are merely specific examples and are not intended to limit embodiments of the present disclosure to specific shapes, hardware, connection relationships, operations, numerical values, conditions, data, order, etc., that are shown and described. Those skilled in the art may utilize the concepts of the present disclosure to construct more embodiments not mentioned in the specification by reading the present specification.

The terms used in the present disclosure are those general terms that are currently widely used in the existing technology by considering the function of the present disclosure. However, these terms may vary according to the intent of those in the art, advancement, or new technology. In addition, specific terms may be selected by the applicant. In this case, the detailed meanings of the specific terms will be described in the detailed description of the present disclosure. Therefore, the terms used in the specification should not be understood as simple names but are based on the meanings of the terms and the general description of the present disclosure.

In the present disclosure, a flowchart is used to illustrate an operation performed by the system according to embodiments of the present disclosure. Previous or following operations are not necessarily performed exactly in order. On the contrary, various steps may be processed in reverse order or simultaneously as needed. Other operations may be added to these processes, or one or more operations may be removed from these processes.

First, some related terms involved in the present disclosure are explained below.

A normal execution environment, also referred to as a rich execution environment (REE), may run an operation system (OS) and a normal program, and store normal information based on a normal area on a system on chip (SoC).

A trusted execution environment (TEE) may provide a function, based on a secure area on a system-on-chip (SoC), provides functions such as isolation execution, secure communication, and secure storage to ensure integrity, confidentiality, and availability of sensitive information in TEE, and provides a secure service for REE.

A cryptographic engine may be configured to perform a corresponding cryptography operation in response to an access request from an execution environment. For example, the cryptographic engine may be configured to perform encrypting, decrypting, and other related operations on the data.

The access request may be a request in TEE, REE, or another execution environment for the cryptographic engine, including but not limited to an encryption request, a decryption request, a signature request related to the encryption request and the decryption request, a signature verification request, a key derivation request, etc.

A computer system may support a variety of execution environments, such as TEE, REE, or other execution environments. All these environments may have a requirement for accessing and using a cryptographic engine. If a set of cryptographic engines are provided for each execution environment, problems such as waste of performance, high cost, high power consumption may be solved. If a set of cryptographic engines are provided for these execution environments, the cryptographic engine and even the entire computer system may need to differentiate the access requests based on from which specific execution environment the access requests are from. Thus, the cryptography operation required by the access request may be performed corresponding to the security of the specific execution environment to ensure the security of performing the cryptography operation.

Moreover, the security of a plurality of execution environments may be different. If access requests from these execution environments may use a set of cryptographic engines simultaneously, a malicious access request from an execution environment with relatively low security may know the operation process of executing the cryptography operation from the access request with relatively high security in the cryptographic engine, which may exist a potential safety hazard.

In addition, in order to perform the cryptography operation required by the access request, the data required for performing the cryptography operation may be stored, for example, object data and attribute information (e.g., types and keys of the cryptographic operation, etc.) of the cryptography operation. If a shared storage area is used to store the data, the cryptography operation required by the access request from an execution environment with relatively high security may be maliciously accessed and modified.

FIG. 1 is a schematic diagram of a microprocessor 100 according to some embodiments of the present disclosure. FIG. 1 shows only major units for description. The microprocessor 100 may include more other units. The microprocessor 100 may be a system on chip (SoC) or a part of the SoC or another suitable system or a part of the system capable of performing a logical operation and data processing.

Referring to FIG. 1, the microprocessor 100 includes a cryptographic engine 102 and a controller 104

The cryptographic engine 102 may be configured to execute a cryptographic algorithm. For example, the cryptographic engine 102 may be configured to perform an encryption algorithm, a decryption algorithm, or other algorithms to perform the cryptography operation on the data.

The cryptographic algorithm maybe a symmetric algorithm, an asymmetric algorithm, a hash algorithm, or other cryptographic algorithms. The symmetric algorithm may be an encryption algorithm that encrypts and decrypts by using a same key. A data sender may encrypt a plaintext using the key and send the encrypted text, the data receiver may restore the encrypted text to the plaintext using the same key after receiving the data. In the symmetric algorithm, since the sender and the receiver use the same key to encrypt the data, the encryption security may not only depend on the encryption algorithm, the security of the key may be also important. The symmetric algorithm may include an SM4 national password, AES128, AES192, AES256, etc. (AES means Advanced Encryption Standard). The asymmetric algorithm may be an encryption algorithm that encrypts and decrypts using different keys. The two keys used by the asymmetric algorithm may include a public key and a private key, respectively. The public key may be paired with the private key. If the data is encrypted with the public key (the private key), the data can only be decrypted using the corresponding private key (the public key). The asymmetric algorithm may include an Elgamal algorithm, a rivest, shamir, and Adleman (RSA) algorithm, etc. The hash algorithm may be a function of changing an arbitrary length input message string into a fixed-length output string. A process of generating a hash value by the hash algorithm may be unidirectional, a reverse operation may be difficult to complete, and a probability that a collision occurs (two different inputs generate a same hash value) may be very small.

The controller 104 may be connected to the cryptographic engine 102 and configured to control the operation of the cryptographic engine 102. The controller 104 may be configured to receive an access request from a first execution environment. The access request may be used to access the cryptographic engine 102 to execute the cryptographic algorithm. The access request may at least include identification information. The identification information may be related to the first execution environment. The first execution environment may be an execution environment of a number N execution environments. N may be an integer greater than or equal to 1. Based on the identification information, the cryptographic engine 102 may be instructed to execute the cryptographic algorithm that needs to be executed required by the access request.

The microprocessor 100 of embodiments of the present disclosure may be configured to receive access requests from different execution environments and distinguish execution environments where the access requests are from based on the identification information, for example, TEE, REE, or another execution environment. Accordingly, the access requests from different execution environments may be securely executed based on corresponding security architectures.

In some embodiments, the number N execution environments may include at least one of TEE, REE, or a security subsystem (also referred to as a Secure Element (SE)). Generally, an application in the security subsystem SE may have higher security than an application in TEE and much higher than an application in REE. The technical solutions of the present disclosure may not be limited to these execution environments and may further include other execution environments with the same security or different security. Thus, the microprocessor 100 of the present disclosure may be applicable to a plurality of execution environments and satisfy the access requests initiated by different execution environments.

Figure 2:
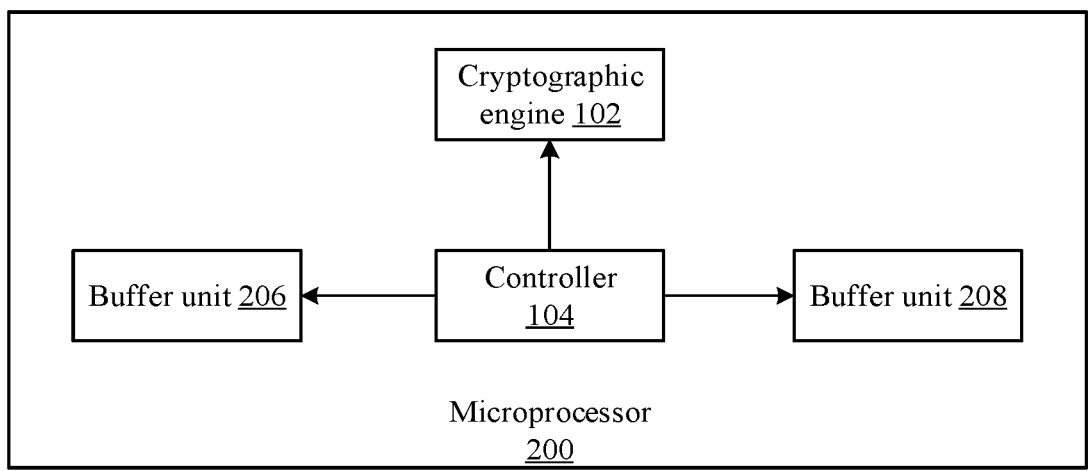
FIG. 2 is a schematic diagram of another microprocessor according to some embodiments of the present disclosure.

FIG. 2 is a schematic diagram of another microprocessor 200 according to some embodiments of the present disclosure. The microprocessor 200 includes more details than the microprocessor 100.

Referring to FIG. 2, compared to the microprocessor 100, the microprocessor 200 further includes one or more buffer units connected to the controller 104, e.g., a buffer unit 206 and a buffer unit 208. A number of the buffer units may be adjusted. The microprocessor 200 may include three or more buffer units.

The plurality of buffer units may be separated from each other. For example, the buffer unit 206 and the buffer unit 208 may be separated from each other. The "separation" may be understood as physical or logical separation. Physically, the buffer unit 206 and the buffer unit 208 may be away from each other. Logically, the buffer unit 206 and the buffer unit 208 may have separate logical addresses.

A first buffer unit of the plurality of buffer units may correspond to the first execution environment of the number N execution environments.

The correspondence may mean that the data required by the access request from the execution environment in the execution process, intermediate data of the execution process, and obtained result data may be stored in a buffer unit corresponding to the execution environment without being stored in another buffer unit. In the microprocessor, each execution environment may be provided with a respective buffer unit, which avoids that the plurality of execution environments share a buffer unit and ensures the security of the data.

For example, when M is equal to N, a number M buffer units may correspond to the number N execution environments in an one-to-one correspondence. For example, three (M=3) buffer units may be provided. Three (N=3) execution environments may include REE, TEE, and SE. A first buffer unit of the three buffer units may correspond to REE, a second buffer unit of the three buffer units may correspond to TEE, and a third buffer unit of the three buffer units may correspond to SE.

For another example, when N>1, M>1, and N<M, that is, the number N of execution environments is smaller than the number M of buffer units. A number N buffer units of the number M buffer units may be in a one-to-one correspondence with the number N execution environments. For example, three buffer units (M=3) may be provided. Two execution environments may include REE and TEE. A first buffer unit of the three buffer units may correspond to REE. A second buffer unit of the three buffer units may correspond to TEE. The other buffer unit may be for another use or used to adapt to a plurality of new execution environments in the future. In some other embodiments, at least one buffer unit may correspond to an execution environment. For example, two or three buffer units may correspond to an execution environment. When a new execution environment is added in the future, a buffer unit of other buffer units may be arranged to correspond to the new execution environment to improve the compatibility of the microprocessor. Thus, when the number of the buffer units is more than the number of execution environments, each execution environment may have its own data buffer unit, which avoids the plurality of execution environments from sharing the same buffer unit, ensures the security of the data, and prepares to be compatible for more execution environments.

For another example, when N>1, M>1, and N>M, that is, the number N of execution environments may be greater than the number M of buffer units, and one or more execution environments of the number N execution environments may correspond to one of the number M buffer units. For example, two buffer units (M=2) may be provided, and three execution environments (N=3) may include REE, TEE, and SE. A first buffer unit of the two buffer units may correspond to REE, and a second buffer unit of the two buffer units may correspond to TEE and SE. Thus, when the number of buffer units is less than the number of execution environments, several execution environments may share a same buffer unit. Thus, a limited number of data buffer units may be applied to the plurality of execution environments.

In addition, a difference between priorities of the several execution environments that share the buffer unit may be less than a predetermined threshold. For example, according to an actual application scenario, a corresponding priority value may be set for each execution environment to indicate the priority of each environment. For example, the priority value may range from 0 to 1, and the greater the value, the higher the priority. For example, when a security requirement is imposed on the microprocessor, the priority value of REE may be set to 0.1, the priority value of TEE may be set to 0.8, the priority value of the SE may be set to 0.9, and the predetermined threshold may be 0.5. Then, the difference between the priority of TEE and the priority of SE may be 0.1 and less than the predetermined threshold of 0.5. Therefore, TEE and SE may share one buffer unit, and REE may use another buffer unit. As such, the security requirement of the computer may be met with the limited number of buffer units. For another example, when a real time requirement is imposed on the microprocessor, the priority value of REE may be set to 0.9, the priority value of TEE may be set to 0.7, the priority value of SE may be set to 0.1, and the predetermined threshold may be 0.5. Thus, the difference between the priority of REE and the priority of TEE may be 0.2 and less than the predetermined threshold of 0.5. Therefore, REE and TEE may share one buffer unit, and SE may use another buffer unit. As such, the real-time requirement of the computer can be satisfied with the limited number of buffer units. The priority values of the environments and the predetermined threshold may be changed according to a specific application scenario. In addition, the difference in the priorities of the execution environments may be measured in another manner. Thus, the microprocessor may be compatible with more execution environments with a limited number of buffer units, and the performance requirement of the microprocessor may be met.

The present disclosure may be not limited to the correspondence of the example. Another correspondence between the buffer unit and the execution environment may exist.

With reference still to FIG. 2, FIG. 2 shows two buffer units. For example, the two buffer units include a buffer unit 206 and a buffer unit 208. The buffer unit 206 may correspond to TEE, and the buffer unit 208 may correspond to REE.

Since the buffer unit corresponds to the corresponding execution environment, the identification information may further be used to identify the first buffer unit corresponding to the first execution environment. For example, the controller 104 may be configured to determine the first buffer unit corresponding to the first execution environment based on the identification information in the access request from the first execution environment and store the data required for performing the cryptographic algorithm of the access request, the intermediate data of the execution process, and the obtained result data.

In some embodiments, the controller 104 may be configured to obtain the data required by the access request in the first buffer unit corresponding to the first execution environment based on the identification information. For example, with reference still to FIG. 2, when the controller 104 receives a TEE access request from TEE, the controller 104 may obtain the data required by the access request in the buffer unit 206 corresponding to TEE based on the identification information. The data required by the access request may include data carried by the access request or data related to the access request. For example, the data required by the access request may include cryptographic algorithm information. The cryptographic algorithm information may include an address of the object data and attribute information of the cryptographic algorithm of the object data. The object data may be data for the cryptographic algorithm. That is, for example, on which data the asymmetric cryptographic algorithm may be performed, that is, the data to be encrypted or decrypted. The attribute information of the cryptographic algorithm of the object data may be an asymmetric key and a length of the key used by the asymmetric cryptographic algorithm, or other information related to the cryptographic algorithm. Further, the controller 104 may be configured to instruct the cryptographic engine 102 to execute the cryptographic algorithm that needs to be executed based on the required data.

Thus, the plurality of buffer units may be isolated from each other and used for the execution environments, respectively, which ensures the security of the data required to perform the cryptographic algorithm, the intermediate data of the execution process, and the result data, etc.

Figure 3:
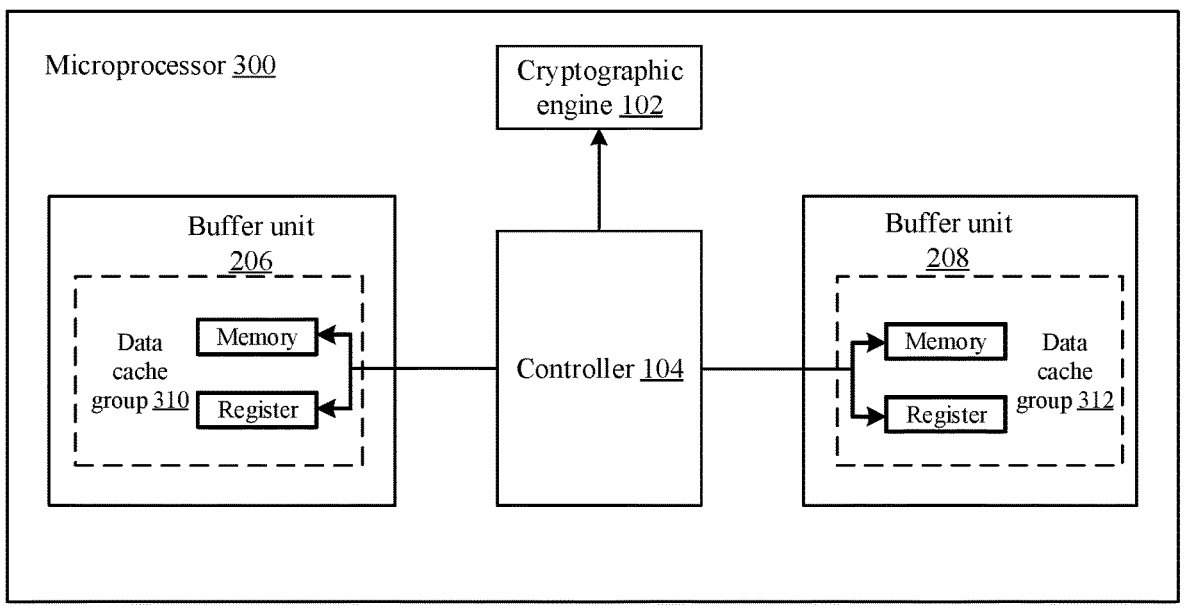
FIG. 3 is a schematic diagram of another microprocessor according to some embodiments of the present disclosure.

FIG. 3 is a schematic diagram of another microprocessor 300 according to some embodiments of the present disclosure. The microprocessor 300 may have more details than the microprocessor 200.

Referring to FIG. 3, compared to the microprocessor 200, the buffer unit of the microprocessor 300 also includes a register and a memory, which may be provided in a form of a data cache group, e.g., a data cache group 310 and a data cache group 312. For example, a buffer unit may include at least one data cache group, and the one data cache group may include a register and a memory.

The register may be configured to register the cryptographic algorithm information. The cryptographic algorithm information may be information required to execute the cryptographic algorithm.

The memory may be used to store the object data. The object data may be the data to be encrypted or decrypted required by the cryptographic algorithm. In some embodiments, the memory may be a first input first output (FIFO) memory. Thus, the data that is first cached may be first processed by the cryptographic engine to implement a high-performance data cache. However, embodiments of the present disclosure are not limited to this, and the memory may be other memory.

As shown in FIG. 3, the buffer unit 206 and the buffer unit 208 each include one or more data cache groups. One data buffer group may be determined to be used for a special/type cryptographic algorithm, for example, the asymmetric cryptographic algorithm. Thus, different data cache groups may be used to provide different rich cryptographic algorithms. Then, the different cryptographic algorithms do not share the data cache group. The independence and security between the different cryptographic algorithms may be maintained.

In some embodiments, the access request from the first execution environment may include the identification information used to identify the first execution environment, the corresponding first buffer unit, and the address of the register. The address information of the register may be used to indicate the address of the register in the first buffer unit (a data cache group). The register may be used to register the cryptographic algorithm information. For example, according to the asymmetric cryptographic algorithm, a certain register may be specified in advance to register the cryptographic algorithm information used to perform the asymmetric cryptographic algorithm. The software in the execution environment may be used to determine the register to register the asymmetric cryptographic algorithm according to the address information of the register and configure the determined register according to the address information of the register carried in the access request. Thus, the register may register the cryptographic algorithm information that is used to execute the asymmetric cryptographic algorithm. The asymmetric cryptographic algorithm may be only an example of the cryptographic algorithm. In some embodiments, the cryptographic algorithm information may be information required to perform any cryptographic algorithm and may include an address of the object data and the attribute information of the cryptographic algorithm of the object data. The object data may be the data for the cryptographic algorithm, e.g., the data encrypted or decrypted with the asymmetric cryptographic algorithm. Thus, through the register address information included in the access request, the controller 104 may search the register to know the cryptographic algorithm information including the address of the object data and the attribute information of the cryptographic algorithm after knowing the address of the register that register the cryptographic algorithm information.

Thus, the controller 104 may be further configured to extract the object data based on the address of the object data and store the object data in the memory of the first buffer unit (in a data cache group). The address of the object data may be determined by the register address information. The controller 104 may be further configured to instruct the cryptographic engine to perform the cryptographic algorithm required by the access request on the object data based on the attribute information of the cryptographic algorithm. The attribute information of the cryptographic algorithm may be determined through the register address information.

In some embodiments, the register in the determined data buffer unit (the data cache group) may be selected based on the register address information to further perform the cryptographic algorithm corresponding to the register. The type of the cryptographic algorithm may be indicated in the access request without additional information. Only the register address information may be needed to determine the register applied for a certain type of cryptographic algorithm.

The microprocessor 300 of embodiments of the present disclosure may be configured to execute the access requests initiated by the plurality of execution environments, ensure data security, and improve the microprocessor performance. For example, in the execution environment, the data corresponding to the access request may be stored in the buffer unit that is specialized for the execution environment. The buffer units corresponding to different execution environments may be separated from each other. Thus, the security isolation of the cryptographic algorithms of different execution environments may be realized, and the security may be improved. For another example, each data cache group in the buffer unit specialized for each execution environment may be specialized for a certain cryptographic algorithm. That is, one data cache group may be specialized to cache the data required by the cryptographic algorithm, which may improve the computation performance of the microprocessor.

In some embodiments, the identification information may be as follows.

In some embodiments, the identification information may be an identifier of a first execution environment. The identification information may directly identify the first execution environment. Different execution environments may have different identifiers. For example, the identifier of the first execution environment may be REE, the identifier information may be REE or may be identified in different segments, for example, 0 may identify REE, 1 may identify TEE. Thus, based on the identifier, the execution environment where the access request is from may be identified.

In some embodiments, the identification information may be source address information that issues an access request. The source address information may correspond to the first execution environment. For example, the identification information may be the source address information, e.g., an IP address or a hardware address of the access request. However, embodiments of the present disclosure may not be limited to this, so long as the source address information is related to a source that issues the access request and corresponds to the execution environment. Thus, a mapping table may be used to indicate a mapping relationship between the source address information and the execution environment. The controller may still know the execution environment corresponding to the access request carrying the identification information through the mapping table. As such, a correspondence between the access request and the execution environment may be implemented without changing a segment protocol of the access request.

In some embodiments, the identification information may be an identifier of the access request. The identifier of the access request may correspond to the first execution environment. For example, the identification information may be an ID number of the access request, e.g., a serial number of the access request. However, embodiments of the present disclosure may not be limited to this, as long as the identifier of the access request corresponds to the execution environment. Thus, the mapping table may be used to indicate the mapping relationship between the identifier of the access request and the execution environment. The controller can still know the execution environment corresponding to the access request carrying the identification information through the mapping table. As such, a correspondence between the access request and the execution environment may be implemented without changing the segment protocol of the access request.

Figure 4:
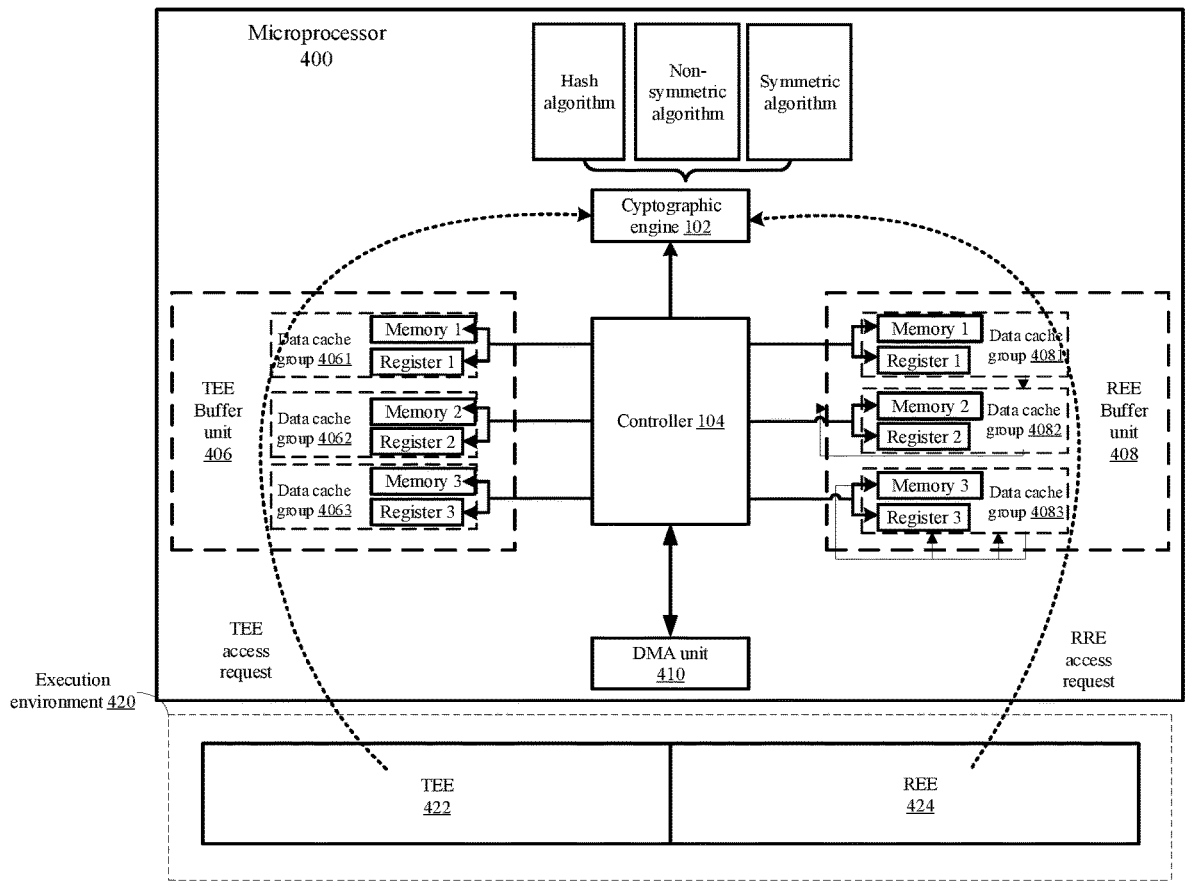
FIG. 4 is a schematic diagram of another microprocessor according to some embodiments of the present disclosure.

In some embodiments, the microprocessor 100 further includes a direct memory access (DMA) unit connected to the controller 104 (see FIG. 4). The controller 104 may also be configured to instruct the DMA unit to transmit the data required to perform the cryptographic algorithm, e.g., the object data or to instruct the DMA unit to transmit the result of performing the cryptographic algorithm of the access request. Thus, the transmission speed of the data and the cryptography operation result may be improved. The cost of the controller 104 for transmitting the data and the cryptography operation result may be reduced. The security of the transmission of the data and the cryptography operation result may be improved.

TEE and REE supported by the computer system, as well as possible SE, or other execution environments may have requirements of using the cryptographic engine. If a cryptographic engine is provided for each execution environment, waste of performance, high cost, and high power consumption may be caused. Therefore, with reference to FIG. 1, in embodiments of the present disclosure, the plurality of execution environments share the cryptographic engine 102. Thus, the access requests initiated by different execution environments may be performed. However, when the access requests initiated by different execution environments access the cryptographic engine 102 simultaneously, or another access request is initiated before the access request is completed, the cryptographic engine 102, the microprocessor 100, or even the entire computer system may break down, or a serious security or password leakage hazards may be caused.

Embodiments of the present disclosure further provide a microprocessor to avoid collisions between the plurality of access requests from different execution environments. The collisions may mean that the plurality of access requests from different execution environments need to occupy or use the computation resources of the cryptographic engine. The microprocessor may be consistent with a hardware structure of the microprocessor 100. Thus, in embodiments of the present disclosure, the microprocessor may be implemented based on the microprocessors 100 to 300 and may be an improvement to the microprocessors 100 to 300, or may be implemented separately in the microprocessor 100. Embodiments of the present disclosure may be described below with reference to the microprocessor 100.

With reference still to FIG. 1, the microprocessor 100 includes the cryptographic engine 102 and the controller 104.

The cryptographic engine 102 May be configured to execute the cryptographic algorithm. The controller 104 is connected to the cryptographic engine 102. The controller 104 may be configured to receive the plurality of access requests. The plurality of access requests may be from a plurality of execution environments, respectively. The controller 104 may be further configured to respond to one access request of the plurality of access requests to instruct the cryptographic engine 102 to execute the cryptographic algorithm.

The microprocessor 100 of embodiments of the present disclosure may be configured to avoid conflicts among the plurality of access requests from different execution environments. For example, the conflict may mean that the plurality of access requests from different execution environments need to occupy or use the computation resources of the cryptographic engine simultaneously. Thus, the crash of the cryptographic engine may be avoided, and the reliability of the microprocessor may be improved. Further, at some point, the cryptographic engine can only be accessed by an access request from a single execution environment and cannot be accessed simultaneously by an access request from another execution environment, which ensures the security of the related data of the access request from the single execution environment.

In some embodiments, the controller 104 may store priorities of the plurality of execution environments. The controller 104 may be configured to respond to an access request from an execution environment with the highest priority first. Thus, the conflicts caused by the access requests from different execution environments accessing the cryptographic engine simultaneously may be avoided based on the priorities of different access requests. The priority may be related to the security of the execution environment. For example, REE may have lowest security. Thus, the priority of REE may be lowest. TEE may have relatively higher security. Thus, the priority of TEE may be is higher. SE may have highest security. Thus, the priority of SE may be highest. Setting of the priority may not be limited to this. The priorities of different execution environments may be set according to other considerations.

In some embodiments, the plurality of access requests may include a first access request and a second access request. The first access request may be from a first execution environment, and the second access request may be from a second execution environment. The priority of the first execution environment may be higher than the second execution environment. For example, the first execution environment may be TEE, and the second execution environment may be REE. The controller 104 may be configured to first respond to the first access request, that is, the access request from TEE. For example, when the conflict is that the first access request and the second access request are received simultaneously, the controller 104 may first respond to the first access request. For another example, when the conflict is that the second access request is received while the cryptographic engine is performing the cryptographic algorithm of the first access request, since the priority of the first execution environment is higher, the controller 104 may continue to execute the cryptographic algorithm of the first access request without executing the second access request until the first access request is executed. For another example, when the conflict is that the first access request is received while the cryptographic engine 102 is executing the cryptographic algorithm of the second access request, since the priority of the first execution environment is higher, the controller 104 may first respond to the first access request, and abort or terminate the execution of the second access request until the first access request is executed. Then, the second access request may continue to be performed or no longer execute the second access request.

Thus, an access request with a high priority may be first performed. For example, the first execution environment may be TEE, the second execution environment may be REE, and the priority of the first access request may be higher than the priority of the second access request. Therefore, the first access request with higher security requirements may be first executed to meet the actual use requirements.

In some embodiments, the plurality of access requests may include the first access request and the second access request. The first access request may be from the first execution environment, the second access request may be from the second execution environment, and the priority of the first execution environment may be higher than the priority of the second execution environment. The controller 104 may be configured to determine whether the cryptographic algorithm that needs to be performed required by the first access request is performed, respond to the second access request in response to the cryptographic algorithm of the first access request being performed to perform the cryptographic algorithm required by the second access request through the cryptographic engine.

In some embodiments, when the cryptographic engine 102 receives the second access request while performing the cryptographic algorithm required by the first access request, the cryptographic engine 102 may continue to perform the cryptographic algorithm of the first access request. The controller 104 may be configured to determine whether the execution of the cryptographic algorithm of the first access request is completed, for example, by monitoring (e.g., at a certain time or timely) a state machine corresponding to the cryptographic engine 102 and respond to the second access request until the cryptographic algorithm of the first access request is completed. Thus, since the priority of the first execution environment is higher than the priority of the second execution environment, the second access request may be responded to only after obtaining the cryptography operation result of the cryptographic algorithm of the first access request, which ensures the security of the data.

In some embodiments, the plurality of access requests may include the first access request from the first execution environment and the second access request from the second execution environment. The priority of the first execution environment may be lower than the priority of the second execution environment. The second access request may be received while the cryptographic algorithm of the first access request is being executed. Thus, if the second execution environment is responded to based on the second execution environment with the higher priority, the following problems may be caused. The data (e.g., intermediate data, including an intermediate cryptography result and other related data) that has been generated while the first access request is being performed may be deleted to prepare to perform the second access request. Thus, the data that has been generated may be wasted, which may cause the waste of the computation resources. If the intermediate cryptography result of the first access request is not cached, the first access request may be caused to have an error or lost, and even the function of the entire microprocessor may be disordered.

In some embodiments, the plurality of access requests may include the first access request and the second access request. The first access request may be from the first execution environment, the second access request may be from the second execution environment, and the priority of the first execution environment may be lower than the priority of the second execution environment. The controller 104 may be configured to determine whether the intermediate cryptography operation result obtained by the first access request is stored and in response to the intermediate cryptography operation result being stored, respond to the second access request to perform the cryptographic algorithm that needs to be executed required by the second access request through the cryptographic engine.

In some embodiments, the second access request may be received while the cryptographic algorithm required by the first access request is being performed. Even if the priority of the first execution environment is lower than the priority of the second execution environment, the cryptographic engine 102 may continue to perform the cryptographic algorithm required by the first access request until the intermediate cryptography operation result of the cryptographic algorithm of the first access request is being stored. The controller 104, for example, may be configured to determine the intermediate cryptography operation result of the cryptographic algorithm of the first access request is stored by monitoring (e.g., at a certain time or timely) the state machine corresponding to the cryptographic engine 102 and respond to the second access request until the intermediate cryptography operation result of the cryptographic algorithm of the first access request is stored. As such, the second access request may be responded to after the intermediate cryptography operation result of the cryptographic algorithm of the first access request. Thus, the security of the data may be ensured, and the second access request with the higher priority may be responded to in time. In addition, the intermediate cryptography operation result generated in the performing process of the first access request may be stored and may continue to be used after the second access request is performed. Thus, the waste of the computation resources may be avoided. Moreover, the second access request may be responded to after the intermediate cryptography operation result of the first cryptographic algorithm is stored instead of waiting after the first cryptographic algorithm is performed. Waite time of the second access request may be reduced, and the performance of the microprocessor may be improved.

FIG. 4 is a schematic diagram of another microprocessor 400 according to some embodiments of the present disclosure. The microprocessor 400 of FIG. 4 may be an example of the microprocessor 100 to 300 with more details. Other structures may also be shown to facilitate exemplary descriptions of application examples of the microprocessor 400.

FIG. 4 shows the microprocessor 400 and an execution environment 420 on the microprocessor 400. FIG. 4 shows only the main units and structures for description. The microprocessor 400 and the execution environment 420 may include more or fewer units.

In FIG. 4, the execution environment 420 includes TEE 422 and REE 424. Each of TEE 422 and REE 424 may include its own software such as an application, an operating system, etc. A number and type of execution environments may be merely exemplary and are not limited here. For example, an application in TEE 422 may initiate a TEE access request for the cryptographic engine 102 to require execution of a cryptographic algorithm. An application in REE 424 may initiate an REE access request for the cryptographic engine 102 to require execution of the same or different cryptographic algorithms.

The microprocessor 400 includes a cryptographic engine 102, a controller 104, a TEE buffer unit 406 corresponding to TEE, an REE buffer unit 408 corresponding to REE, and a DMA unit 410. The TEE buffer unit 406 and the REE buffer unit 408 may correspond to the buffer unit 206 and the buffer unit 208 in FIG. 2, respectively.

The cryptographic engine 102 may store one or more cryptographic algorithms, such as a symmetric algorithm, an asymmetric algorithm, a hash algorithm, or other cryptographic algorithms. The cryptographic engine 102 may be controlled by the controller 104 to schedule these cryptographic algorithms to perform the cryptographic algorithms on the received data (e.g., the object data above).

The TEE buffer unit 406 and the REE buffer unit 408 are away from each other to achieve secure isolation of different execution environments. For example, the buffer unit 406 and the buffer unit 408 are separated from each other. The "separation" may be understood as a physical or logical separation. Physically, the buffer unit 406 and the buffer unit 408 may be far away from each other. Logically, the buffer unit 406 and the buffer unit 408 may have separate logical addresses.

The TEE buffer unit 406 and the REE buffer unit 408 may each include at least one data cache group. The one data cache group may correspond to a cryptographic algorithm. For example, the TEE buffer unit 406 may include a data cache group 4061, 4062, and 4063. The data cache groups 4061, 4062, and 4063 may correspond to a symmetric algorithm, an asymmetric algorithm, and a hash algorithm, respectively. The REE buffer unit 408 may include data cache groups 4081, 4082, and 4083. The data cache groups 4081, 4082, and 4083 may correspond to a symmetric algorithm, an asymmetric algorithm, and a hash algorithm, respectively. Thus, the data cache groups may be dedicated to their own cryptographic algorithms. The data cache groups may be independent of each other, which may avoid mutual interference and improve the efficiency of performing the access request.

Data cache groups 4061, 4062, 4063, 4081, 4082, and 4083 each have their own registers and memory. The number of registers and memory may be adjusted according to the needs of the cryptographic algorithm and the size of the object data, which is not limited by the present disclosure. The memory and registers may be numbered. The registers with a same number may be specialized to a same cryptographic algorithm. For example, two data cache groups of the same cryptographic algorithm, e.g., the data cache group 4061 used to store the object data that is encrypted using the symmetric algorithm in TEE 422 and the data cache group 4081 used to store the object data that is encrypted using the symmetric algorithm in REE may have a same type and structure. Thus, the data cache group that is specialized to the same cryptographic algorithm in different execution environments may use the register with the same numbering to simplify the design and manufacture of the data cache group. For different data cache groups of different cryptographic algorithms, e.g., registers of the data cache group 4061 specialized to the symmetric algorithm and the data cache group 4062 specialized to the asymmetric algorithm may have different numberings for different cryptographic algorithms. The memory may have the same or different numbering. For example, different cryptographic algorithms may be performed on the same object data stored in the memory. The symmetric algorithm and the asymmetric algorithm may be performed on the object data. Therefore, the plurality of data cache groups in the same buffer unit may have the same memory or separated memories.

The register may be used as an interface for software and the controller 104 in the execution environment. For example, the software may be used to configure a corresponding register based on the access request, that is, a process or a part of the process of receiving the access request by the controller 104. The configured register may have the corresponding cryptographic algorithm information. The cryptographic algorithm information here may also be referred to as register information. The controller 104 may be further configured to control an operation of another related unit (e.g., DMA unit 410, memory 1 to 3, or cryptographic engine 102, etc.) based on the cryptographic algorithm information to execute the access request.

For example, TEE 422 may initiate a TEE access request of using a symmetric algorithm to encrypt the object data. The register corresponding to the symmetric algorithm may be configured based on the TEE access request, e.g., register 1 in the data cache group 4061. Thus, register 1 may have the corresponding cryptographic algorithm information. The controller 104 may be further configured to control an operation of another unit based on the cryptographic algorithm information. The cryptographic algorithm information may be the information required by the controller 104 to perform the access request to control other modules, e.g., include but is not limited to, the address/size of the object data, the attribute information of the cryptographic algorithm (e.g., selection or use of the cryptographic algorithm, selection of an algorithm mode, start of the cryptographic engine, etc.).

Registers 1 to 3 shown in FIG. 4 are arranged as register groups 1 to 3 according to the requirement of the cryptographic algorithm information used in practice. For example, register 1 may be used as register group 1. A register group may include a register indicating the address/size of the object data, a register indicating a specific algorithm of a type of cryptographic algorithm, a register indicating a key, and a register indicating to start the cryptographic engine to perform the cryptographic algorithm. Each register may be configured in the software to register corresponding configuration information. For example, register groups 1 to 3 may be specialized to one kind or one type of cryptographic algorithm and may include the register (i.e., algorithm selection register) indicating a specific algorithm of a certain type of cryptographic algorithm, which may register a corresponding value through configuration of the software. The value may be used to indicate the specific cryptographic algorithm of the certain type of cryptographic algorithm. For example, the data cache group 4061 may be specialized to the symmetric algorithm. Register 1 may also include an algorithm selection register. The algorithm selection register may be configured by software and based on the access request to register the corresponding value. For example, value 0 may correspond to symmetric algorithm SM4 national password. Value 1 may correspond to symmetric algorithm AES128, value 2 may correspond to symmetric algorithm AES192, value 3 may correspond to symmetric algorithm AES256, etc. Another register may be configured similarly or differently with corresponding cryptographic algorithm information.

The memory may be used to store the object data. For example, memory 1 in the data cache group 4061 may be used to cache the object data encrypted/decrypted using the symmetric algorithm for the TEE access request. Memory 1 in the data cache group 4081 may be used to store the object data encrypted/decrypted using the symmetric algorithm for the REE access request. Memory 2 in the data cache group 4062 may be used to store the object data encrypted/decrypted by using the asymmetric algorithm for the TEE access request. Memory 2 in the data cache group 4082 may be used to store the object data encrypted/decrypted using the asymmetric algorithm for the REE access request. Memory 3 in the data cache group 4063 may be used to store the object data encrypted/decrypted using the Hash algorithm for the TEE access request. Memory 3 in the data cache group 4083 may be used to store the object data encrypted/decrypted by using the Hash algorithm for the REE access request. The memory may be a FIFO memory, a static random access memory (SRAM), or another memory capable of caching data.

As described above, each data cache group may have its own register and memory, which may reduce the design complexity of the microprocessor. The data cache groups may be independent of each other, which may avoid mutual interference and improve the efficiency of performing the access request.

The DMA unit 410 may be configured to transmit the object data from an external storage device of the microprocessor 400 to the memory in the corresponding data cache group or transmit the cryptography operation result to the external storage device of the microprocessor 400. For example, the DMA unit 410 may be configured to actively transmit the object data according to the cryptographic algorithm information, which can release the operation capability of the controller, improve the data transmission speed, and improve the security of the data transmission. In practical applications, since a certain delay exists for the DMA unit 410 to read the data, the data participating in the cryptographic algorithm may need to be stored in the memory of the data cache group while the cryptographic engine 102 is performing the cryptographic algorithm. If the data participating in the cryptographic algorithm is not stored, the cryptographic engine 102 may have a certain idle period. Thus, the utilization rate of the cryptographic engine may be low. Therefore, the object data may be transmitted before the cryptographic engine 102 performs the cryptographic algorithm.

Based on the description of the units of the microprocessor 400 shown in FIG. 4, the workflow of processing the access request by the microprocessor 400 may be as follows. The software in the execution environment 420 (e.g., REE422 or TEE 424) may be used to configure the corresponding register. The controller 104 may be triggered to start an operation. The controller 104 may trigger the DMA unit 410. The DMA unit 410 may read the object data and store the read object data in the memory in the data cache group. The controller 104 may detect that the data of the memory is not empty, starts reading the object data from the memory, transmits the object data to the cryptographic engine 102 according to the requirement of the cryptographic algorithm, and waits to obtain the cryptography operation result of the cryptographic algorithm. Then, the cryptography operation result may be stored under the control of the controller 104 or directly written into an external cache. The above actions may be repeated until the cryptography operation is completed.

Therefore, the microprocessor 400 of embodiments of the present disclosure may be configured to perform the access requests from different execution environments, ensure the data security, and improve the microprocessor performance.

The structure of the microprocessor 400 shown in FIG. 4 is merely an example for illustration. In some embodiments, changes and modifications may be made to the structure without departing from the scope of the present disclosure. For example, different numbers of data cache groups may be set according to the number of cryptographic algorithms. The number, structure, etc., of the data cache groups specialized to the execution environments may be same or different. The DMA unit 410 may not be necessary. The data needed to perform the cryptographic algorithm or the cryptography operation result of the cryptographic algorithm may be transmitted by another technology.

Similar to the microprocessors 100 to 300 shown in FIGS. 1 to 3, the microprocessor 400 may also solve the conflict problem caused by simultaneously accessing to the cryptographic engine in different execution environments.

With reference still to FIG. 4, in some embodiments, when only the TEE access request is received, the controller 104 may instruct the cryptographic engine 102 to execute the cryptographic algorithm that needs to be performed required by the TEE access request in response to the TEE access request. When only the REE access request is received, the controller 104 may instruct the cryptographic engine 102 to execute the cryptographic algorithm that needs to be performed required by the REE access request in response to the REE access request. Thus, there is no conflict between the two access requests.

In some embodiments, the controller 104 may be configured to simultaneously receive the TEE access request and the REE access request at a certain time or within a period of time. Thus, the two access requests may have a collision. For example, when the TEE access request and the REE access request are simultaneously received, or when the cryptographic engine 102 is executing the cryptographic algorithm of one access request of the TEE access request and the REE access request, the other access request may be received. Then, the controller 104 may respond to one of the TEE access request and the REE access request, e.g., the TEE access request, and perform the cryptographic algorithm according to the TEE access request.

In some embodiments, the controller 104 may store the priorities of the TEE access request and the REE access request. The controller 104 may be configured to first respond to the access request from the execution environment with the highest priority based on the priority. For example, the priority may be related to the security. Since the priority of the TEE access request may be higher than the priority of the REE access request, the controller 104 may respond to the TEE access request first. Although the priority in the specification is described by the security priority. That is, the priority of TEE may be higher than the priority of REE. The priority may also refer to a time priority or a priority of another performance requirement. Therefore, in some embodiments, the priority of TEE access request may be lower than the priority of the REE access request. Thus, the controller 104 may respond to and perform the REE access request first.

In some embodiments, the cryptographic engine 102 may receive the REE access request while performing the cryptographic algorithm that needs to be performed required by the TEE access request. The controller 104 may be configured to determine whether the cryptographic algorithm that needs to be performed required by the TEE access request is performed, and in response to the execution of the cryptographic algorithm that needs to be performed required by the TEE access request being completed, respond to the REE access request to perform the cryptographic algorithm that needs to be performed required by the REE access request by the cryptographic engine 102. In addition, the controller 104 may be configured to continue to perform the cryptographic algorithm that needs to be executed required by the TEE access request until the cryptographic algorithm is performed in response to the execution of the cryptographic algorithm that needs to be performed required by the TEE access request being not completed.

In some embodiments, the cryptographic engine 102 may receive the TEE access request while performing the cryptographic algorithm that needs to be performed required by the REE access request. The controller 104 may be configured to determine whether the intermediate cryptography operation result obtained by the cryptographic algorithm that needs to be performed required by the REE access request is stored and, in response to the intermediate cryptography operation result being not stored, respond to the TEE access request to perform the cryptographic algorithm that needs to be executed required by the TEE access request by the cryptographic engine 102. In addition, the controller 104 may be configured to, in response to the intermediate cryptography operation result being not stored, continue to perform the cryptographic algorithm that needs to be performed required by the REE access request until the intermediate cryptography operation result is stored. In addition, the controller 104 may be further configured to determine whether the execution of the cryptographic algorithm that needs to be performed required by the TEE access request is completed and, in response to the execution of the cryptographic algorithm of the TEE access request being completed, instruct the cryptographic engine 102 to continue to perform the cryptographic algorithm of the REE access request based on the stored intermediate cryptography operation result.

Although two execution environments are described above in connection with the embodiments described in FIG. 4, embodiments of the present disclosure may also be applied to more execution environments. For example, a three-system execution environment including TEE, REE, and SE. A register unit corresponding to SE may be arranged accordingly.

The microprocessor 400 shown in FIG. 4 may be a more detailed example of the microprocessors 100 to 300 shown in FIG. 1 to FIG. 3. The advantages of the microprocessors 100 to 300 may be mapped to the microprocessor 400 and are not repeated here.

A computer system may have a need to support at least one execution environment to use the cryptographic engine to perform the cryptographic algorithm. In order to perform the cryptographic algorithm required by the access request, the data needed to perform the cryptographic algorithm may be stored, e.g., the object data on which the cryptographic algorithm is performed and the attribute information of the cryptographic algorithm (e.g., a type of the cryptography operation and key). If the shared storage area is used to store the needed data, the data required by the cryptography operation required by the access request from the execution environment with a relatively high safety may be maliciously accessed and modified. Therefore, a corresponding architecture may need to be provided for each execution environment to securely instruct the cryptographic engine to perform the cryptographic algorithm.

Figure 5:
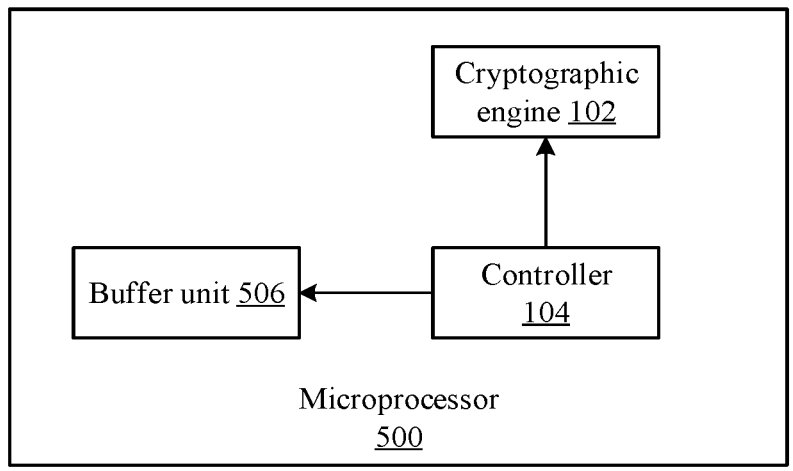
FIG. 5 is a schematic diagram of another microprocessor according to some embodiments of the present disclosure.

FIG. 5 is a schematic diagram of another microprocessor 500 according to some embodiments of the present disclosure.

As shown in FIG. 5, the microprocessor 500 includes a cryptographic engine 102, a controller 104, and a number M buffer units. M is an integer greater than or equal to 1 (FIG. 5 only shows a buffer unit 506).

The cryptographic engine 102 may be configured to execute the cryptographic algorithm.

The number M buffer units may be configured to cache the data required by the access request of the execution environment. For example, the buffer unit 506 may correspond to the REE and may be configured to cache data required by the REE access request.

The controller 104 may be connected to the cryptographic engine 102 and the number M buffer units. The controller 104 may be configured to receive the access request from the first execution environment. The access request may access the cryptographic engine to perform the cryptographic algorithm. The first execution environment may be one of the number N execution environments. N may be an integer greater than or equal to 1. The controller 104 may be further configured to, based on the access request, instruct the cryptographic engine to perform the cryptographic algorithm that needs to be performed required by the access request on the required data cached in the buffer unit corresponding to the first execution environment.

The data required by the access request of the execution environment may be stored in the corresponding buffer unit. Thus, the required data may be stored in a targeted manner. The security of the data may be ensured, and the cryptographic engine may be safely indicated to perform the cryptographic algorithm.

In some embodiments, when M is greater than 1, the number M buffer units may be separated from each other. Thus, the data in the number M buffer units may be isolated from each other, which ensures the security of the data.

In some embodiments, when M is equal to N, the number M buffer units may correspond to the number N execution environments in an one-to-one correspondence. Thus, each execution environment may have its own data buffer unit, which avoids the plurality of execution environments from sharing the same buffer unit and ensures the security of the data.

In some embodiments, when N>1, M>1, and N<M. The number N buffer units of the number M buffer units may be in a one-to-one correspondence with the number N execution environments. Thus, when the number of buffer units are more than the number of execution environments, each execution environment may have its own data buffer unit, which avoids the plurality of execution environments share the same buffer unit, and ensures the security of the data.

In some embodiments, when N>1, M>1, and N>M, one or more execution environments of the number N execution environments may correspond to one of the number M buffer units. Thus, when the number of buffer units is less than the number of execution environments, several execution environments may share the same buffer unit, In addition, the several execution environments that correspond to the one of the number M buffer units may have same or similar priorities. For example, the execution environments may have same or similar security priorities to improve the security of the data.

Thus, the plurality of buffer units may be isolated from each other and used in a variety of execution environments, which ensures the security of the data required to perform the cryptographic algorithm, the intermediate data of the execution process, and the obtained result data.

Embodiments of the microprocessor 500 shown in FIG. 5 may be implemented separately or may be implemented in the microprocessors 100 to 400 shown in FIGS. 1 to 4. The technical effects of embodiments of the microprocessor 500 may also be mapped to the microprocessors 100 to 400, which is not repeated here.

Figure 6:
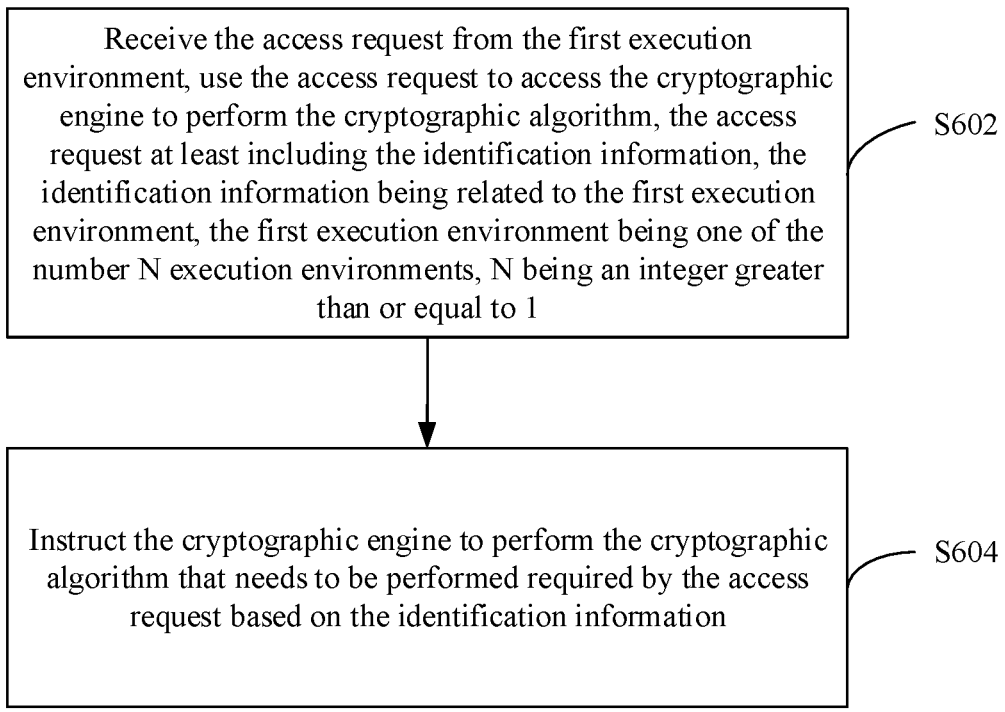
FIG. 6 is a schematic flowchart of a data processing method according to some embodiments of the present disclosure.

FIG. 6 is a schematic flowchart of a data processing method according to some embodiments of the present disclosure.

Embodiments of the present disclosure further provide a data processing method, which is applied to the microprocessor. The microprocessor may include the cryptographic engine and the controller. The data processing method includes processes S602 to S604 shown in FIG. 6 performed by the controller (e.g., the controller 104).

At S602, the controller receives the access request from the first execution environment. The access request is used to access the cryptographic engine to perform the cryptographic algorithm. The access request at least includes the identification information. The identification information is related to the first execution environment. The first execution environment is one of the number N execution environments. N is an integer greater than or equal to 1.

At S604, the controller instructs the cryptographic engine to perform the cryptographic algorithm that needs to be performed required by the access request based on the identification information.

The microprocessor 100 of embodiments of the present disclosure can receive access requests from different execution environments and can distinguish the execution environments where the access requests are from based on the identification information, e.g., TEE, REE, or another execution environment. As such, the access requests from different execution environments may be securely performed based on corresponding security architectures.

In some embodiments, the microprocessor may further include the plurality of buffer units connected to the controller. The plurality of buffer units may be separated from each other. The first buffer unit of the plurality of buffer units may correspond to the first execution environment of the N execution environments. The identification information may be further used to identify the first buffer unit corresponding to the first execution environment. Based on the identification information, instructing the cryptographic engine to perform the cryptographic algorithm that needs to be executed required by the access request may include obtaining the data required by the access request from the first buffer unit corresponding to the first execution environment based on the identification information and based on the required data, instructing the cryptographic engine to perform the cryptographic algorithm that needs to be performed required by the access request. Thus, the plurality of buffer units may be isolated from each other and used for respective execution environments, which ensures the security of the data required to perform the cryptographic algorithm, the intermediate data of the execution process, and the obtained result data.

In some embodiments, the access request may further include the register address information. The register address information may be used to indicate the address of the register of the first buffer unit. The register may be used to register the cryptographic algorithm information. The cryptographic algorithm information may include the address of the object data and the attribute information of the cryptographic algorithm of the object data. The object data may be the data for the cryptographic algorithm. Based on the required data, instructing the cryptographic engine to perform the cryptographic algorithm that needs to be performed required by the access request may include extracting the object data based on the address of the object data and storing the object data in the memory of the first buffer unit. The address of the object data may be determined by the register address information. Based on the required data, instructing the cryptographic engine to perform the cryptographic algorithm that needs to be performed required by the access request may further include instructing the cryptographic engine to perform the cryptographic algorithm that needs to be performed required by the access request on the object data based on the attribute information of the cryptographic algorithm. The attribute information of the cryptographic algorithm may be determined by the register address information. Thus, the register in the determined buffer unit may be selected based on the register address information, and the cryptographic algorithm corresponding to the register may be then performed. Therefore, the corresponding algorithm may be scheduled according to the register address information carried by the access request in a targeted manner.

In some embodiments, the identification information may include one of the identifiers of the first execution environment, the source address information where the access request is initiated, and the identifier of the access request. The source address information may correspond to the first execution environment. The identifier of the access request may correspond to the first execution environment. Thus, a variety of identification information may be provided.

In some embodiments, when N is greater than 1, the data processing method may further include receiving the plurality of access requests, the plurality of access requests being from the number N execution environments, responding to one access request of the plurality of access requests, and instructing the cryptographic engine to perform the cryptographic algorithm according to the identification information carried in the access request. Thus, the conflicts among the plurality of access requests from different execution environments may be avoided, which ensures the security of the related data of the access request from the single execution environment.

In some embodiments, the controller may store the priorities corresponding to the number N execution environments. Responding to the one access request of the plurality of access requests may include first responding to the access request from the execution environment with the highest priority based on the priority. Thus, the conflict caused by accessing the cryptographic engine simultaneously by the access requests of the different execution environments based on the priorities of different access requests. The security of the microprocessor may be ensured, and the practicability may be improved.

In some embodiments, the plurality of access requests may include the first access request and the second access request. The first access request may be from the first execution environment, the second access request may be from the second execution environment, and the priority of the first execution environment may be higher than the priority of the second execution environment. Responding to the one access request of the plurality of access requests may include determining whether the execution of the cryptographic algorithm that needs to be performed required by the first access request is completed, responding to the second access request in response to the execution of the cryptographic algorithm of the first access request being completed to perform the cryptographic algorithm required by the second access request through the cryptographic engine. Thus, after the cryptography operation result of the cryptographic algorithm required by the first access request is obtained, the second access request may be responded to, which ensures the security of the data.

In some embodiments, the plurality of access requests may include the first access request and the second access request. The first access request may be from the first execution environment, the second access request may be from the second execution environment, and the priority of the first execution environment may be lower than the priority of the second execution environment. Responding to the one access request of the plurality of access requests may include determining whether the intermediate cryptography operation result obtained by the first access request is stored and in response to the intermediate cryptography operation result being stored, responding to the second access request to perform the cryptographic algorithm that needs to be executed required by the second access request through the cryptographic engine. Thus, first, the second access request may be responded to only after the intermediate password operation result of the cryptographic algorithm of the first access request is obtained, which ensures the security of the data. Then, the second access request may be responded to not to wait until the execution of the first cryptographic algorithm is completed but until the intermediate cryptography operation result of the first cryptographic algorithm has been stored, which reduces the wait time of the second access request and improves the performance of the microprocessor.

In some embodiments, the data processing method may further include determining whether the execution of the cryptographic algorithm that needs to be performed required by the second access request is completed, and in response to the execution of the cryptographic algorithm of the second access request being completed, instructing the cryptographic engine to continue to execute the cryptographic algorithm of the first access request based on the stored intermediate cryptography operation result. Thus, the generated intermediate cryptography operation result may be stored and may continue to be used, which avoids the waste of the computation resources.

In some embodiments, the number N execution environments may include at least one of TEE and REE. Thus, embodiments of the present disclosure may be applicable to the plurality of execution environments. The access requests of different execution environments may be satisfied in a targeted manner by the microprocessor of the present disclosure.

In some embodiments, the microprocessor may further include the DMA unit. The data processing method may further include instructing the DMA unit to transmit the data to be encrypted or decrypted required by performing the cryptographic algorithm or instructing the DMA unit to transmit the result of performing the cryptographic algorithm of the access request. Thus, the operation capability of the controller may be released, the data transmission speed may be improved, and the security of the data transmission may also be improved.

The data processing method described above in connection with FIG. 6 and the additional aspects thereof may be applied to the microprocessors 100 to 400 described with reference to FIGS. 1 to 4. The technical effects of embodiments described with reference to FIGS. 1 to 4 may be mapped to the above-described processing method and additional aspects of the processing method, which are not repeated here. The above processing method and the additional aspects of the processing method may also be partially or entirely applied to the microprocessor 500 described with reference to FIG. 5.

Figure 7:
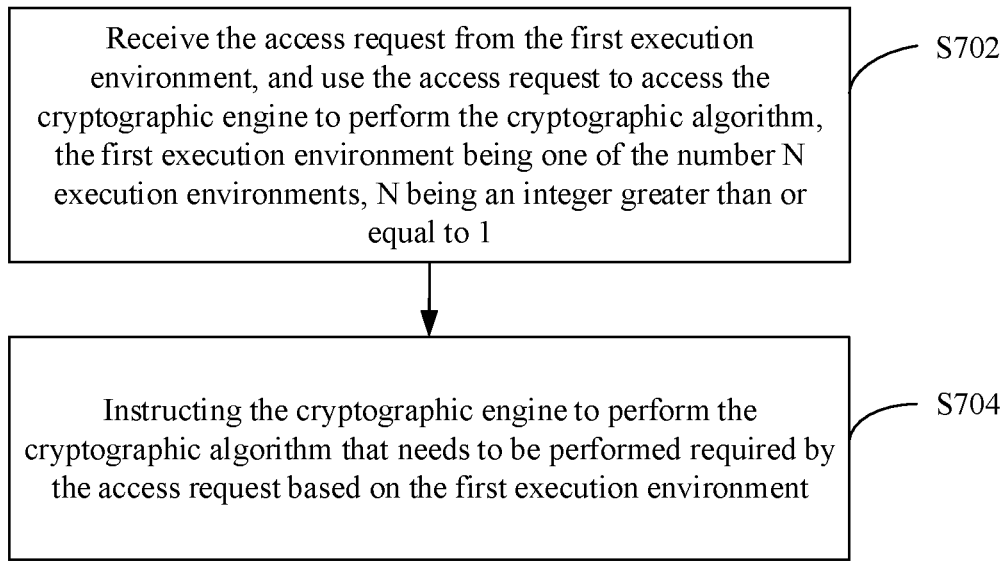
FIG. 7 is a schematic flowchart of another data processing method according to some embodiments of the present disclosure.

FIG. 7 is a schematic flowchart of another data processing method according to some embodiments of the present disclosure.

Embodiments of the present disclosure further provide a data processing method, which is applied to the microprocessor. The microprocessor may include the cryptographic engine, the number M buffer units, and the controller. The cryptographic engine may be configured to execute the cryptographic algorithm. The number M buffer units may be configured to buffer the data required by the access request of the corresponding execution environment. M may include an integer greater than or equal to 1. The controller is connected to the cryptographic engine and the M buffer units, and the data processing method may include executing processes S702-S704 shown in FIG. 7 by the controller.

At S702, the controller receives the access request from the first execution environment. The access request is used to access the cryptographic engine to perform the cryptographic algorithm. The first execution environment is one of the number N execution environments. N is an integer greater than or equal to 1.

At S704, the controller instructs the cryptographic engine to perform the cryptographic algorithm that needs to be performed required by the access request based on the first execution environment.

In some embodiments, the data required by the access request of the execution environment is stored in the corresponding buffer units, so that the required data can be stored in a targeted manner, so that the security of the data is ensured, and the cryptographic engine can be configured to perform the cryptographic algorithm safely.

In some embodiments, where M is greater than 1, the M buffer units are separated from each other. As such, the data of the M buffer units are isolated from each other, thereby ensuring the security of the data.

In some embodiments, where M=N, the M buffer units correspond to the N execution environments in a one-to-one correspondence. As such, each execution environment has a respective data buffer unit, which avoid sharing one buffer unit by multiple execution environments, thereby ensuring the security of the data.

In some embodiments, where N>1, M>1, and N>M, the M buffer units correspond to the N execution environments in a one-to-one correspondence. As such, where the number of buffer units is greater than the number of execution environments, each execution environment has a respective data buffer unit, which avoids sharing one buffer unit with multiple execution environments, thereby ensuring the security of the data.

In some embodiments, where N>1, M>1, and N>M, the M buffer units one or more execution environments in the N execution environments correspond to one of the M buffer units. As such, where the number of buffer units is less than the number of execution environments, a buffer unit may be shared by multiple execution environments, implementing limited data buffer units may be applicable to multiple execution environments.

In some embodiments, the difference between the priorities of the plurality of execution environments corresponding to one buffer unit is less than a predetermined threshold. As such, it is possible to address how much more execution environments are compatible in the case of only limited buffer units on hardware and enable the microprocessor to meet performance requirements.

In some embodiments, N execution environments include at least one of a TEE, an REE, or a SE. As such, the embodiments of the present disclosure may be applicable to multiple execution environments. The microprocessor described in the present disclosure may meet access requests of different execution environments in a targeted manner.

In some embodiments, the microprocessor may further include a DMA unit. The data processing method further includes the following operations performed by the controller. The controller may be configured to instruct the DMA unit to transmit the data required to perform the cryptographic algorithm. The controller may also be configured to instruct the DMA unit to transmit the result of performing the cryptographic algorithm of the access request. Thus, the operation capability of the controller can be released, the transmission speed of the data and the cryptography operation result may be improved, and the security of the transmission of the data and the cryptography operation result may be improved.

The data processing method described is associated with FIG. 7 and the additional aspects thereof may be applied to the microprocessor 500 described with reference to FIG. 5, and the technical effects of the embodiments described with reference to FIG. 5 may be applied to the foregoing data processing method and the additional aspects thereof, and details are not described herein again. The above processing method and the additional aspects thereof may be partially or entirely applied in the microprocessor 100-400 described with reference to FIG. 1 to FIG. 4.

Figure 8:
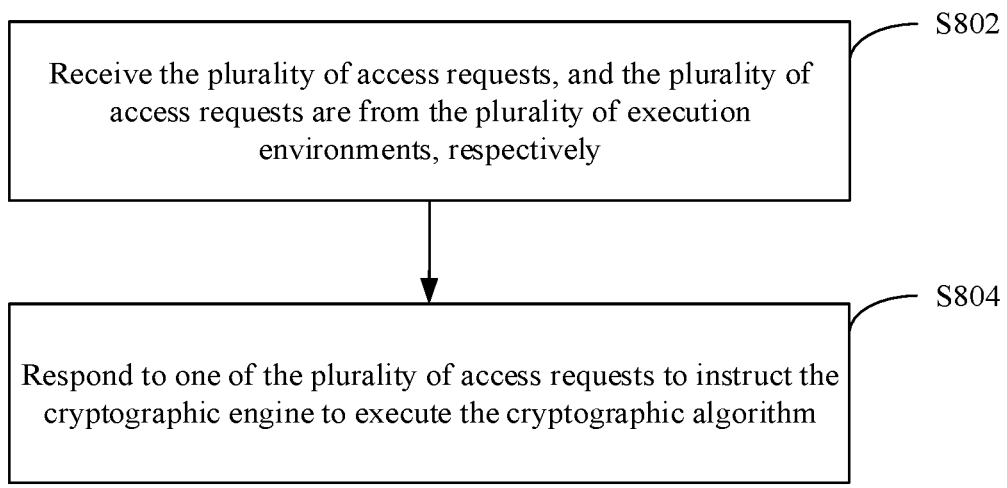
FIG. 8 is a schematic flowchart of another data processing method according to some embodiments of the present disclosure.

FIG. 8 is a schematic flowchart of another data processing method according to some embodiments of the present disclosure.

Embodiments of the present disclosure further provide a data processing method, which is applied to the microprocessor. The microprocessor may include the cryptographic engine, the number M buffer units, and the controller. The cryptographic engine may be configured to execute the cryptographic algorithm. The controller is connected to the cryptographic engine. The data processing method may include executing the processes shown in FIG. 8 by the controller.

At S802, the controller is configured to receive the plurality of access requests, and the plurality of access requests are from the plurality of execution environments, respectively.

At S804, the controller is configured to respond to one of the plurality of access requests to instruct the cryptographic engine to execute the cryptographic algorithm.

Only one access request of the plurality of access requests may be responded to to avoid the conflict among the plurality of access requests from different execution environments. For example, the conflict may mean that the plurality of access requests from different execution environments need to occupy or use the computation resources of the cryptographic engine simultaneously. Thus, the crash of the cryptographic engine may be avoided, and the reliability of the microprocessor may be improved. Further, at some point, the cryptographic engine can only be accessed by an access request from a single execution environment and cannot be accessed simultaneously by an access request from another execution environment, which ensures the security of the related data of the access request from the single execution environment.

In some embodiments, the controller may be configured to store the priorities of the plurality of execution environments. Responding to one access request of the plurality of access requests may include first responding to the access request from the execution environment with the highest priority based on the priority. Thus, the conflict caused by accessing the cryptographic engine simultaneously by the access requests of the different execution environments based on the priorities of different access requests. The security of the microprocessor may be ensured, and the practicability may be improved.

In some embodiments, the plurality of access requests may include the first access request and the second access request. The first access request may be from the first execution environment, the second access request may be from the second execution environment, and the priority of the first execution environment may be higher than the priority of the second execution environment. Responding to the one access request of the plurality of access requests may include determining whether the execution of the cryptographic algorithm that needs to be performed required by the first access request is completed, responding to the second access request in response to the execution of the cryptographic algorithm of the first access request being completed to perform the cryptographic algorithm required by the second access request through the cryptographic engine. Thus, after the cryptography operation result of the cryptographic algorithm required by the first access request is obtained, the second access request may be responded to, which ensures the security of the data.

In some embodiments, the plurality of access requests may include the first access request and the second access request. The first access request may be from the first execution environment, the second access request may be from the second execution environment, and the priority of the first execution environment may be lower than the priority of the second execution environment. Responding to the one access request of the plurality of access requests may include determining whether the intermediate cryptography operation result obtained by the first access request is stored, and in response to the intermediate cryptography operation result being stored, responding to the second access request to perform the cryptographic algorithm that needs to be executed required by the second access request through the cryptographic engine. Thus, first, the second access request may be responded to only after the intermediate password operation result of the cryptographic algorithm of the first access request is obtained, which ensures the security of the data. Then, the second access request may be responded to not to wait until the execution of the first cryptographic algorithm is completed but until the intermediate cryptography operation result of the first cryptographic algorithm has been stored, which reduces the wait time of the second access request and improves the performance of the microprocessor.

In some embodiments, the data processing method may further include determining whether the execution of the cryptographic algorithm that needs to be executed required by the second access request is completed, and in response to the execution of the cryptographic algorithm of the second access request being completed, instructing the cryptographic engine to continue to execute the cryptographic algorithm of the first access request based on the stored intermediate cryptography operation result. Thus, the generated intermediate cryptography operation result may be stored and may continue to be used, which avoids the waste of computation resources.

In some embodiments, the plurality of execution environments may include at least one of TEE, REE, or SE. Thus, embodiments of the present disclosure may be applicable to the plurality of execution environments. The access requests of different execution environments may be satisfied in a targeted manner by the microprocessor of the present disclosure.

In some embodiments, the microprocessor may further include a DMA unit. The data processing method may further include instructing the DMA unit to transmit the data to be encrypted or decrypted required by performing the cryptographic algorithm or instructing the DMA unit to transmit the result of performing the cryptographic algorithm of the access request. Thus, the operation capability of the controller may be released, the data transmission speed may be improved, and the security of the data transmission may also be improved.

The data processing method described above and the additional aspects of the data processing method may be applied to the microprocessors 200 shown in FIG. 2. The technical effects of embodiments described with reference to FIG. 2 may be mapped to the above-described processing method and the additional aspects of the processing method, which are not repeated here. The above processing method and the additional aspects of the processing method may also be partially or entirely applied to the microprocessor 100 described with reference to FIG. 1 or the microprocessors 300 to 500 described with reference to FIGS. 2 to 5.

Although the microprocessors and the data processing methods are described in connection with specific drawings, the aspects of these microprocessors and these data processing methods may be combined and may be applicable to each other.

Figure 9:
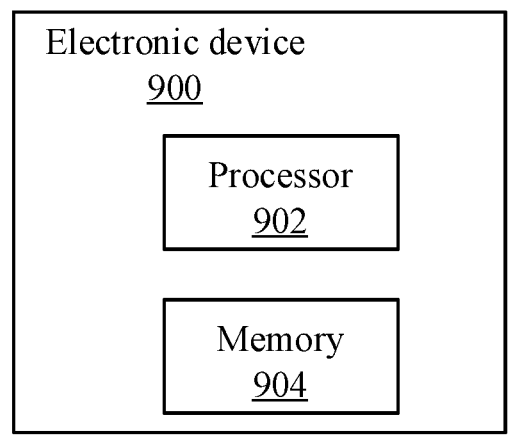
FIG. 9 is a schematic diagram of an electronic device according to some embodiments of the present disclosure.

FIG. 9 is a schematic diagram of an electronic device 900 according to some embodiments of the present disclosure.

With reference to FIG. 9, the electronic device 900 includes various assemblies 902 and 904. As shown in FIG. 9, the electronic device 900 includes one or more processors 902 and one or more memories 904. In some embodiments, the electronic device 900 may include other assemblies as needed.

The electronic device 900 may include one or more applications. These applications may be instruction sets (e.g., computer program codes) that, when read by the one or more processors 902, cause the one or more processors 902 to control the operation of the electronic device 900. Thus, the one or more memories 904 may include instructions/data that are executed by the one or more processors 902. Thus, the electronic device 900 may be configured to perform the methods of embodiments of the present disclosure.

Figure 10:
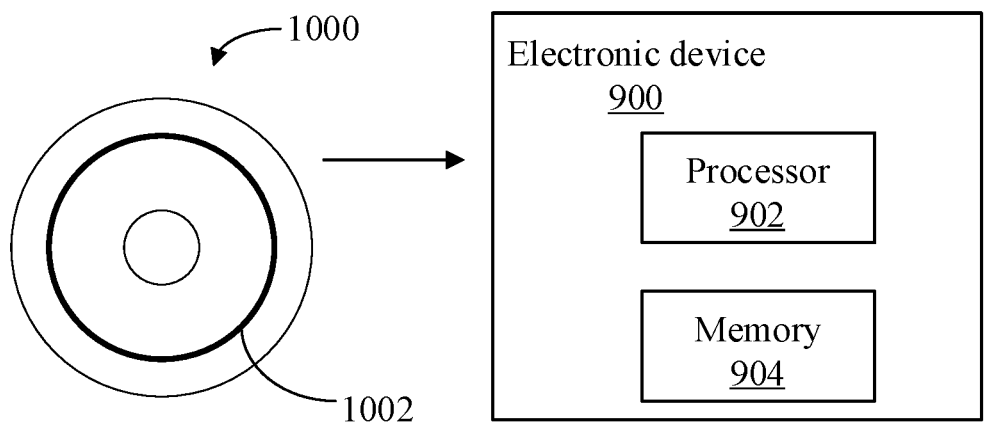
FIG. 10 is a schematic diagram of a computer-readable storage medium according to some embodiments of the present disclosure.

FIG. 10 is a schematic diagram of a computer-readable storage medium 1000 according to some embodiments of the present disclosure. For example, the computer-readable storage medium 1000 may be in a form of a data disk. However, embodiments of the present disclosure may not be limited to this. The computer-readable storage medium 1000 may also include another medium, such as an optical disk, a digital video disk, a flash memory, or another common memory technology. In some embodiments, the data disk 1000 may include a magnetic data storage disk. The data disk 1000 may be configured to carry an instruction 1002. The instruction 1002 may be read or loaded into the memory 904 of the electronic device 900 shown in FIG. 9. When the processor 902 of the electronic device 900 executes the instruction, the electronic device 900 may be caused to perform the methods of embodiments of the present disclosure.

Exemplary embodiments of the protection scope of the present disclosure are as follows.

Embodiment 1A

A microprocessor may include a cryptographic engine and a controller. The cryptographic engine may be configured to execute a cryptographic algorithm. The controller may be connected to the cryptographic engine. The controller may be configured to receive an access request from a first execution environment. The access request may need to access the cryptographic engine to execute the cryptographic algorithm. The access request at least includes identification information. The identification information is related to the first execution environment. The first execution environment may be one execution environment of the number N execution environments. N may be an integer greater than or equal to 1. The controller may be further configured to, based on the identification information, instruct the cryptographic engine to execute the cryptographic algorithm that needs to be executed required by the access request.

Embodiment 2A

The microprocessor of embodiment 1A further includes a plurality of buffer units connected to the controller. The plurality of buffer units may be separated from each other. A first buffer unit of the plurality of buffer units may correspond to a first execution environment of the number N execution environments. The identification information may be further used to identify the first buffer unit corresponding to the first execution environment. The controller may be configured to obtain data required by the access request in the first buffer unit corresponding to the first execution environment based on the identification information and instruct the cryptographic engine to execute the cryptographic algorithm that needs to be executed required by the access request based on the required data.

Embodiment 3A

In the microprocessor of Embodiment 2A, the access request may further include register address information. The register address information may be used to indicate an address of a register in the first buffer unit. The register may be used to register cryptographic algorithm information. The cryptographic algorithm information may include an address of the object data and attribute information of the cryptographic algorithm of the object data. The object data may be data for the cryptographic algorithm. The controller may be configured to extract the object data based on the address of the object data and store the object data in a memory of the first buffer unit. The address of the object data may be determined by the register address information. The controller may be further configured to instruct the cryptographic engine to execute the cryptographic algorithm that needs to be performed required by the access request on the object data based on the attribute information of the cryptographic algorithm. The attribute information of the cryptographic algorithm may be determined by the register address information.

Embodiment 4A

In the microprocessor of any one of Embodiment 1A to 3A, the identification information may include one of an identifier of the first execution environment, source address information where the access request is sent, and an identifier of the access request. The source address information may correspond to the first execution environment. The identifier of the access request may correspond to the first execution environment.

Embodiment 5A

In the microprocessor of Embodiment 1A, when N is greater than 1, the controller may be further configured to receive the plurality of access requests from the number N execution environments, respond to one access request of the plurality of access requests, and instruct the cryptographic engine to execute the cryptographic algorithm according to the identification information carried in the access request.

Embodiment 6A

In the microprocessor of Embodiment 5A, the controller may be configured to store priorities corresponding to the number N execution environments. The controller may be configured to respond to the access request from the execution environment with the highest priority based on the priority.

Embodiment 7A

In the microprocessor of Embodiment 5A, the plurality of access requests may include a first access request and a second access request. The first access request may be from a first execution environment, the second access request may be from a second execution environment. A priority of the first execution environment may be higher than a priority of the second execution environment. The controller may be configured to determine whether an execution of the cryptographic algorithm that needs to be executed required by the first access request is completed, and in response to the execution of the cryptographic algorithm of the first access request being completed, respond to the second access request to execute the cryptographic algorithm that needs to be executed required by the second access request by the cryptographic engine.

Embodiment 8A

In the microprocessor of Embodiment 5A, the plurality of access requests may include a first access request and a second access request. The first access request may be from a first execution environment. The second access request may be from a second execution environment. A priority of the first execution environment may be lower than a priority of the second execution environment. The controller may be configured to determine whether the intermediate cryptography operation result obtained by the first access request is stored and, in response to the intermediate cryptography operation result being stored, respond to the second access request to execute the cryptographic algorithm that needs to be executed required by the second access request by the cryptographic engine.

Embodiment 9A

In the microprocessor of Embodiment 8A, the controller may be further configured to determine whether execution of the cryptographic algorithm that needs to be executed required by the second access request is completed and, in response to the execution of the cryptographic algorithm of the second access request being completed, instruct the cryptographic engine to continue to execute the cryptographic algorithm of the first access request based on the stored intermediate cryptography operation result.

Embodiment 10A

In the microprocessor of any of the Embodiments 1A to 9A, the number N execution environments may include at least one of TEE, REE, or SE.

Embodiment 11A

The microprocessor of any of the Embodiments 1A to 9A may further include a DMA unit. The controller may be configured to instruct the DMA unit to transmit data required to execute the cryptographic algorithm or instruct the DMA unit to transmit the result of executing the cryptographic algorithm of the access request.

Embodiment 12A

A data processing method may be applied to a microprocessor. The microprocessor may include a cryptographic engine and a controller. The data processing method may include receiving an access request from a first execution environment. The access request may need to access the cryptographic engine to execute the cryptographic algorithm. The access request at least includes identification information. The identification information is related to the first execution environment. The first execution environment may be one execution environment of the number N execution environments. N may be an integer greater than or equal to 1. The method may further include, based on the identification information, instructing the cryptographic engine to execute the cryptographic algorithm that needs to be executed required by the access request.

Embodiment 13A

In the data processing method of Embodiment 12A, the microprocessor may further include a plurality of buffer units connected to the controller. The plurality of buffer units may be separated from each other. A first buffer unit of the plurality of buffer units may correspond to a first execution environment of the number N execution environments. The identification information may be further used to identify the first buffer unit corresponding to the first execution environment. Based on the identification information, instructing the cryptographic engine to execute the cryptographic algorithm that needs to be executed by the access request may include obtaining data required by the access request in the first buffer unit corresponding to the first execution environment based on the identification information and instructing the cryptographic engine to execute the cryptographic algorithm that needs to be executed required by the access request based on the required data.

Embodiment 14A

In the data processing method of Embodiment 13A, the access request may further include register address information. The register address information may be used to indicate an address of a register in the first buffer unit. The register may be used to register cryptographic algorithm information. The cryptographic algorithm information may include an address of the object data and attribute information of the cryptographic algorithm of the object data. The object data may be data for the cryptographic algorithm. Instructing the cryptographic engine to execute the cryptographic algorithm that needs to be executed required by the access request based on the required data may include extracting the object data based on the address of the object data and storing the object data in a memory of the first buffer unit. The address of the object data may be determined by the register address information. Instructing the cryptographic engine to execute the cryptographic algorithm that needs to be executed required by the access request based on the required data may further include instructing the cryptographic engine to execute the cryptographic algorithm that needs to be performed required by the access request on the object data based on the attribute information of the cryptographic algorithm. The attribute information of the cryptographic algorithm may be determined by the register address information.

Embodiment 15A

In the data processing method of any one of Embodiments 12A to 14A, the identification information may include one of an identifier of the first execution environment, source address information where the access request is sent, and an identifier of the access request. The source address information may correspond to the first execution environment. The identifier of the access request may correspond to the first execution environment.

Embodiment 16A

In the data processing method of Embodiment 12A, when N is greater than 1, the data processing method may be further include receiving the plurality of access requests from the number N execution environments, responding to one access request of the plurality of access requests, and instructing the cryptographic engine to execute the cryptographic algorithm according to the identification information carried in the access request.

Embodiment 17A

In the data processing method of Embodiment 16A, the controller may be configured to store priorities corresponding to the number N execution environments. Responding to the one access request of the plurality of access requests may include responding to the access request from the execution environment with the highest priority based on the priority.

Embodiment 18A

In the data processing method of Embodiment 16A, the plurality of access requests may include a first access request and a second access request. The first access request may be from a first execution environment, the second access request may be from a second execution environment. A priority of the first execution environment may be higher than a priority of the second execution environment. Responding to the one access request of the plurality of access requests may include determining whether an execution of the cryptographic algorithm that needs to be executed required by the first access request is completed, and in response to the execution of the cryptographic algorithm of the first access request being completed, responding to the second access request to execute the cryptographic algorithm that needs to be executed required by the second access request by the cryptographic engine.

Embodiment 19A

In the data processing method of Embodiment 16A, the plurality of access requests may include a first access request and a second access request. The first access request may be from a first execution environment. The second access request may be from a second execution environment. A priority of the first execution environment may be lower than a priority of the second execution environment. Responding to the one access request of the plurality of access requests may include determining whether the intermediate cryptography operation result obtained by the first access request is stored and, in response to the intermediate cryptography operation result being stored, responding to the second access request to execute the cryptographic algorithm that needs to be executed required by the second access request by the cryptographic engine.

Embodiment 20A

The data processing method of Embodiment 19A may further include determining whether execution of the cryptographic algorithm that needs to be executed required by the second access request is completed and, in response to the execution of the cryptographic algorithm of the second access request being completed, instructing the cryptographic engine to continue to execute the cryptographic algorithm of the first access request based on the stored intermediate cryptography operation result.

Embodiment 21A

In the data processing method of any of the Embodiments 12A to 20A, the number N execution environments may include at least one of TEE, REE, or SE.

Embodiment 22A

In the data processing method of any of the Embodiments 12A to 20A, the microprocessor may further include a DMA unit. The data processing method may further include instructing the DMA unit to transmit data required to execute the cryptographic algorithm or instructing the DMA unit to transmit the result of executing the cryptographic algorithm of the access request.

Embodiment 23A

An electronic device may include a memory and a processor. The memory may be used to store an instruction. The processor may be configured to read the instruction in the memory and perform the data processing methods of any of Embodiments 12A to 22A.

Embodiment 24A

A computer-readable storage medium storing an instruction that, when the instruction is executed by a processor, causes the processor to perform the data processing methods of any of Embodiments 12A to 22A.

Embodiment 1B

A microprocessor may include a cryptographic engine, a number M of buffer units, and a controller. The cryptographic engine may be configured to execute the cryptographic algorithm. The number M of buffer units may be configured to cache the data required of the access request of a corresponding execution environment. M may be an integer greater than or equal to 1. The controller may be connected to the cryptographic engine and the number M of buffer units. The controller may be configured to receive an access request from a first execution environment. The access request may need to access the cryptographic engine to perform the cryptographic algorithm. The first execution environment may be an execution environment of the number N execution environments. N may be an integer greater than or equal to 1. The controller may be further configured to, based on the access request, instruct the cryptographic engine to execute the cryptographic algorithm that needs to be executed required by the access request by using the required data cached in the buffer unit corresponding to the first execution environment.

Embodiment 2B

In the microprocessor of Embodiment 1B, when M is greater than 1, the number M buffer units may be separated from each other.

Embodiment 3B

In the microprocessor of any of Embodiments 1B and 2B, when M=N, the number M buffer units may have a one-to-one correspondence to the number N execution environments.

Embodiment 4B

In the microprocessor of any of Embodiments 1B and 2B, when N>1, M>1, and N<M, the number N buffer units of the number M buffer units may have a one-to-one correspondence to the number N execution environments.

Embodiment 5B

In the microprocessor of any of Embodiments 1B and 2B, when N>1, M>1, and N>M, one or more execution environments of the number N execution environments may correspond to one buffer unit of the number M buffer units.

Embodiment 6B

In the microprocessor of Embodiment 5B, a difference of priorities of a plurality of execution environments corresponding to the one buffer unit may be smaller than a predetermined threshold.

Embodiment 7B

In the microprocessor of any of Embodiments 1B to 6B, the number N execution environments may include at least one of TEE, REE, or SE.

Embodiment 8B

The microprocessor of any of Embodiments 1B to 6B may further include a DMA unit. The controller may be further configured to instruct the DMA unit to transmit the data required to perform the cryptographic algorithm or instruct the DMA unit to transmit a result of performing the cryptographic algorithm of the access request.

Embodiment 9B

A data processing method may be applicable to a microprocessor. The microprocessor may include a cryptographic engine, a number M of buffer units, and a controller. The cryptographic engine may be configured to execute the cryptographic algorithm. The number M of buffer units may be configured to cache the data required of the access request of a corresponding execution environment. M may be an integer greater than or equal to 1. The controller may be connected to the cryptographic engine and the number M of buffer units. The data processing method may include receiving an access request from a first execution environment. The access request may need to access the cryptographic engine to perform the cryptographic algorithm. The first execution environment may be an execution environment of the number N execution environments. N may be an integer greater than or equal to 1. The method may further include, based on the access request, instructing the cryptographic engine to execute the cryptographic algorithm that needs to be executed required by the access request by using the required data cached in the buffer unit corresponding to the first execution environment.

Embodiment 10B

In the data processing method of Embodiment 9B, when M is greater than 1, the number M buffer units may be separated from each other.

Embodiment 11B

In the data processing method of any of Embodiments 9B and 10B, when M=N, the number M buffer units may have a one-to-one correspondence to the number N execution environments.

Embodiment 12B

In the data processing method of any of Embodiments 9B and 10B, when N>1, M>1, and N<M, the number N buffer units of the number M buffer units may have a one-to-one correspondence to the number N execution environments.

Embodiment 13B

In the data processing method of any of Embodiments 9B and 10B, when N>1, M>1, and N>M, one or more execution environments of the number N execution environments may correspond to one buffer unit of the number M buffer units.

Embodiment 14B

In the data processing method of Embodiment 13B, a difference of priorities of a plurality of execution environments corresponding to the one buffer unit may be smaller than a predetermined threshold.

Embodiment 15B

In the data processing method of any of Embodiments 9B to 14B, the number N execution environments may include at least one of TEE, REE, or SE.

Embodiment 16B

In the data processing method of any of Embodiments 9B to 14B, the microprocessor may further include a DMA unit. The data processing method may further include instructing the DMA unit to transmit the data required to perform the cryptographic algorithm or instructing the DMA unit to transmit a result of performing the cryptographic algorithm of the access request.

Embodiment 17B

An electronic device may include a memory and a processor. The memory may be used to store an instruction. The processor may be configured to read the instruction in the memory and perform the data processing methods of any of Embodiments 9B to 16B.

Embodiment 1C

A microprocessor may include a cryptographic engine and a controller. The cryptographic engine may be configured to execute a cryptographic algorithm. The controller may be connected to the cryptographic engine. The controller may be configured to receive a plurality of access requests from the plurality of execution environments and respond to one access request of the plurality of access requests to indicate the cryptographic engine to perform the cryptographic algorithm.

Embodiment 2C

In the microprocessor of 1C, the controller may be configured to store priorities of the plurality execution environments. The controller may be configured to first respond to an access request from an execution environment with a highest priority based on the priority.

Embodiment 3C

In the microprocessor of Embodiment 1C, the plurality of access requests may include a first access request and a second access request. The first access request may be from a first execution environment. The second access request may be from a second execution environment. The priority of the first execution environment may be higher than the priority of the second execution environment. The controller may be configured to determine whether the execution of the cryptographic algorithm that needs to be executed required by the first access request is completed, and in response to the execution of the cryptographic algorithm of the first access request being completed, respond to the second access request to execute the cryptographic algorithm that needs to be executed required by the second access request by the cryptographic engine.

Embodiment 4C

In the microprocessor of Embodiment 1C, the plurality of access requests may include the first access request and the second access request. The first access request may be from the first execution environment. The second access request may be from the second execution environment. The priority of the first execution environment may be lower than the priority of the second execution environment. The controller may be configured to determine whether an intermediate cryptography operation result obtained by the first access request is stored, and in response to the intermediate cryptography operation result being stored, respond to the second access request to execute the cryptographic algorithm that needs to be executed required by the second access request by the cryptographic engine.

Embodiment 5C

In the microprocessor of Embodiment 4C, the controller may be further configured to determine whether the execution of the cryptographic algorithm that needs to be executed required by the second access request is completed, and in response to the execution of the cryptographic algorithm of the second access request is completed, instruct the cryptographic engine to continue to execute the cryptographic algorithm of the first access request based on the stored intermediate cryptography operation result.

Embodiment 6C

In the microprocessor of any of Embodiments 1C to 5C, the plurality of execution environments may include at least one of TEE, REE, or SE.

Embodiment 7C

The microprocessor of any of Embodiments 1C to 5C may further include a DMA unit. The controller may be further configured to instructing the DMA unit to transmit the data required to execute the cryptographic algorithm or instructing the DMA unit to transmit the result of executing the cryptographic algorithm of the access request.

Embodiment 8C

A data processing method may be applicable to a microprocessor. The microprocessor may include a cryptographic engine and a controller. The cryptographic engine may be configured to execute a cryptographic algorithm. The controller may be connected to the cryptographic engine. The controller may be configured to receive a plurality of access requests from the plurality of execution environments and respond to one access request of the plurality of access requests to indicate the cryptographic engine to perform the cryptographic algorithm.

Embodiment 9C

In the data processing method of 8C, the controller may be configured to store priorities of the plurality execution environments. Responding to the one access request of the plurality of access requests may include first responding to an access request from an execution environment with a highest priority based on the priority.

Embodiment 10C

In the data processing method of Embodiment 8C, the plurality of access requests may include a first access request and a second access request. The first access request may be from a first execution environment. The second access request may be from a second execution environment. The priority of the first execution environment may be higher than the priority of the second execution environment. Responding to the one access request of the plurality of access requests may include determining whether the execution of the cryptographic algorithm that needs to be executed required by the first access request is completed, and in response to the execution of the cryptographic algorithm of the first access request being completed, responding to the second access request to execute the cryptographic algorithm that needs to be executed required by the second access request by the cryptographic engine.

Embodiment 11C

In the data processing method of Embodiment 8C, the plurality of access requests may include the first access request and the second access request. The first access request may be from the first execution environment. The second access request may be from the second execution environment. The priority of the first execution environment may be lower than the priority of the second execution environment. Responding to the one access request of the plurality of access requests may include determining whether an intermediate cryptography operation result obtained by the first access request is stored, and in response to the intermediate cryptography operation result being stored, responding to the second access request to execute the cryptographic algorithm that needs to be executed required by the second access request by the cryptographic engine.

Embodiment 12C

The data processing method of Embodiment 11C may further include determining whether the execution of the cryptographic algorithm that needs to be executed required by the second access request is completed, and in response to the execution of the cryptographic algorithm of the second access request is completed, instructing the cryptographic engine to continue to execute the cryptographic algorithm of the first access request based on the stored intermediate cryptography operation result.

Embodiment 13C

In the data processing method of any of Embodiments 8C to 12C, the plurality of execution environments may include at least one of TEE, REE, or SE.

Embodiment 14C

In the data processing method of any of Embodiments 8C to 12C, the microprocessor may further include a DMA unit. The data processing method may further include instructing the DMA unit to transmit the data required to execute the cryptographic algorithm or instructing the DMA unit to transmit the result of executing the cryptographic algorithm of the access request.

Embodiment 15C

An electronic device may include a memory and a processor. The memory may be used to store an instruction. The processor may be configured to read the instruction in the memory and perform the data processing methods of any of Embodiments 8C to 14C.

Embodiment 16C

A computer-readable storage medium storing an instruction that, when the instruction is executed by a processor, causes the processor to perform the data processing methods of any of Embodiments 8C to 14C.

In the detailed description, for purposes of explanation and not limitation, details are described in order to provide a thorough understanding of the various aspects and embodiments of the present disclosure. In some embodiments, detailed descriptions of well-known devices, assemblies, circuits, and methods have been omitted so as not to obscure the description of embodiments of the present disclosure with unnecessary details. All statements and examples of the principles, aspects, and embodiments disclosed in the present disclosure are intended to cover both structural equivalent and functional equivalent. In addition, such equivalents are intended to include the currently known equivalents as well as equivalents developed in the future, i.e., any element developed that performs a same function, regardless of the structure. Thus, for example, the block diagram of the present specification may represent conceptual diagrams of illustrative circuit system or another functional unit, which represents the principles of embodiments of the present disclosure. Similarly, any flowchart may represent various processes, which may be represented substantially in a computer-readable storage medium and executed by a computer or processor, no matter whether such computer or processor is explicitly shown. The functions of various elements including the functional blocks may be provided by using hardware (such as circuit hardware and/or hardware capable of executing software in the form of encoded instructions stored on the computer-readable storage medium described above). Thus, such function and functional blocks may be implemented by hardware and/or computer, that is implemented by a machine. For the hardware implementation, the functional block may include, but is not limited to, digital signal processor (DSP) hardware, a reduced instruction set processor, a hardware (e.g., digital or analog) circuit system, which includes, but is not limited to, an application specific integrated circuit (ASIC) and/or a field programmable gate array (FPGA), and a state machine capable of performing these functions (when appropriate). For the computer implementation, the computer may include one or more processors or one or more controllers. When the function is provided by a computer or processor or controller, the function may be provided by a single dedicated computer or processor or controller, a single shared computer or processor or controller, or a plurality of individual computers or processors or controllers. some of the computers or processors or controllers may be shared or distributed. In addition, the terms "processor," "controller," or "control logic," may also be understood to represent other hardware capable of performing such functions and/or executing the software, such as example hardware listed above.

Various embodiments of the present disclosure are described in a progressive manner. Each embodiment focuses on a difference from other embodiments. The same or similar parts between embodiments may refer to each other.

In embodiments of the present disclosure, each block in the flowchart or block diagram may represent a module, a program segment, or a portion of code, which includes one or more executable instructions for implementing the specified logical functions. In some other embodiments, the functions marked in the block/operation may occur in a sequence different from the sequence marked in the accompanying drawings. For example, two continuous blocks/operations may, in fact, be executed in parallel or may may sometimes be executed in the reverse order, depending upon the functions involved. Each block/operation in the block diagram and/or flowchart and a combination of the block/operation of the block diagram and/or flowchart may be implemented with a dedicated hardware-based system that perform the specified functions or actions, or may be implemented with a combination of the dedicated purpose hardware and computer instructions.

When the at least one function described in embodiments of the present disclosure is implemented in the form of a software functional module and sold or used as an independent product, the at least one function may be stored in a computer-readable storage medium. Thus, the technical solution, a part of the technical solution contributed to the existing technology, or a part of the technical solutions may be embodied in a form of a software product. The computer software product may be stored in a storage medium, and includes several instructions, which may be used to cause a computer device (i.e., a personal computer, a server, or a network device, etc.) to perform all or part of the operations of the method of various embodiments of the present disclosure. The storage medium may include a USB flash disk, a mobile hard drive, a read-only memory (ROM), a random access memory (RAM), a magnetic disk, or an optical disk, which can store the program codes.

In documents of the present disclosure, relationship terms such as first and second are merely used to distinguish one entity or operation from another entity or operation without necessarily requiring or implying any such actual relationship or order between these entities or operations. Moreover, the terms "comprising," "including," or any other variation thereof, are intended to cover a non-exclusive inclusion, such that a process, method, article, or device that includes a series of elements not only includes those elements, but further includes other elements not explicitly listed, or further includes elements inherent to such processes, methods, articles, or devices. When there is no more limitation, the element defined by the term "including . . . " does not the presence of additional identical elements in the process, method, article, or device that includes the element.

The above are only some embodiments of the present disclosure and are not intended to limit the present disclosure. For those skilled in the art, modifications and changes may be made to the present disclosure. Any modifications, equivalent replacements, and improvements made within the spirit and principle of the present disclosure shall be within the scope of the present disclosure.

The above are only specific embodiments of the present disclosure. However, the scope of the present disclosure may not be limited to this. Those skilled in the art may think of changes or replacements within the scope of the present disclosure. The changes or replacements may be within the scope of the present disclosure. Therefore, the scope of the present disclosure may be subjected to the appended claims and their equivalents changes or substitutions can be easily conceived of by a person skilled in the art within the of the present disclosure. Therefore, the protection scope of the present disclosure shall be subject to the appended claims and their equivalents.

What is claimed is:

1. A microprocessor comprising:

a cryptographic engine configured to execute a cryptographic algorithm; and a controller connected to the cryptographic engine and configured to:

receive an access request from a first execution environment, the access request accessing the cryptographic engine to execute the cryptographic algorithm, the access request including at least identification information, the identification information indicating that the access request is from the first execution environment, the first execution environment being an execution environment of a number N execution environments, N being an integer greater than 1, and access requests from different execution environments requiring execution of different cryptographic algorithms; and based on the identification information, instruct the cryptographic engine to execute the cryptographic algorithm that needs to be executed by the access request with respect to the first execution environment.

2. The microprocessor of claim 1, further comprising:

a plurality of buffer units connected to the controller, the plurality of buffer units being separated from each other, a first buffer unit of the plurality of buffer units corresponding to the first execution environment of a number N execution environments, and the identification information being further used to identify the first buffer unit corresponding to the first execution environment, and the controller being configured to:

based on the identification information, obtain data required by the access request in the first buffer unit corresponding to the first execution environment; and based on the required data, instruct the cryptographic engine to execute the cryptographic algorithm that needs to be executed required by the access request with respect to the first execution environment.

3. The microprocessor of claim 2, wherein:

the access request further includes register address information, the register address information being used to indicate an address of a register in the first buffer unit, the register being used to register cryptographic algorithm information, the cryptographic algorithm information including an address of object data and attribute information of a cryptographic algorithm of the object data, and the object data being data for the cryptographic algorithm; and the controller is configured to:

extract the object data based on the address of the object data and store the object data in a memory of the first buffer unit, wherein the address of the object data is determined by the register address information; and instruct the cryptographic engine to perform the cryptographic algorithm that needs to be executed with respect to the first execution environment on the object data based on the attribute information of the cryptographic algorithm, wherein the attribute information of the cryptographic algorithm is determined by the register address information.

4. The microprocessor of claim 1, wherein the identification information includes one of:

an identifier of the first execution environment;

source address information of the access request, the source address information corresponding to the first execution environment; and an identifier of the access request, the identifier of the access request corresponding to the first execution environment.

5. The microprocessor of claim 1, wherein the controller is further configured to:

receive a plurality of access requests from the number N execution environments; and respond to one access request of the plurality of access requests and instruct the cryptographic engine to execute the cryptographic algorithm with respect to one of the number N execution environments according to the identification information carried in the access request.

6. The microprocessor of claim 5, wherein:

the controller stores priorities corresponding to the number N execution environments; and the controller is configured to:

first respond to an access request from an execution environment having a highest priority based on the priorities.

7. The microprocessor of claim 5, wherein:

the plurality of access requests include a first access request from the first execution environment, and a second access request from a second execution environment, a priority of the first execution environment being higher than a priority of the second execution environment; and the control unit is configured to:

determine whether an execution of the cryptographic algorithm that needs to be executed required by the first access request is completed; and in response to the execution of the cryptographic algorithm of the first access request being completed, respond to the second access request to execute a cryptographic algorithm that needs to be executed required by the second access request by the cryptographic engine.

8. The microprocessor of claim 5, wherein:

the plurality of access requests include a first access request from the first execution environment and a second access request from a second execution environment, a priority of the first execution environment being lower than the second execution environment; and the controller is configured to:

determine whether an intermediate cryptography operation result obtained by the first access request is stored; and in response to the intermediate cryptography operation result being stored, respond to the second access request to execute the cryptographic algorithm that needs to be executed required by the second access request through the cryptographic engine.

9. The microprocessor of claim 8, wherein the controller is further configured to:

determine whether an execution of the cryptographic algorithm that needs to be executed required by the second access request is completed; and in response to the execution of the cryptographic algorithm of the second access request being completed, instruct the cryptographic engine to continue to execute the cryptographic algorithm of the first access request based on the stored intermediate cryptography operation result.

10. The microprocessor of claim 1, wherein the number N execution environments include at least one of a trusted execution environment (TEE), an ordinary execution environment (REE), and a security subsystem (SE).

11. The microprocessor of claim 1, further comprising a direct memory access (DMA) unit, the controller being configured to:
   instruct the DMA unit to transmit data required to perform the cryptographic algorithm; or
   instruct the DMA unit to transmit a result of executing the cryptographic algorithm of the access request.

12. A data processing method, applied to a microprocessor, comprising:
   receiving an access request from a first execution environment, the access request accessing a cryptographic engine to execute a cryptographic algorithm, the access request including at least identification information, the identification information indicating that the access request is from the first execution environment, the first execution environment being an execution environment of a number N execution environments, N being an integer greater than 1, and access requests from different execution environments requiring execution of different cryptographic algorithms; and
   based on the identification information, instructing the cryptographic engine to execute the cryptographic algorithm that needs to be executed required by the access request with respect to the first execution environment.

13. The method of claim 12, wherein:
   the microprocessor includes:
      a plurality of buffer units connected to a controller, the plurality of buffer units being separated from each other, a first buffer unit of the plurality of buffer units corresponding to the first execution environment of a number N execution environments, and the identification information being further used to identify the first buffer unit corresponding to the first execution environment; and
   based on the identification information, instructing the cryptographic engine to execute the cryptographic algorithm that needs to be executed required by the access request with respect to the first execution environment includes:
      based on the identification information, obtaining data required by the access request in the first buffer unit corresponding to the first execution environment; and
      based on the required data, instructing the cryptographic engine to execute the cryptographic algorithm that needs to be executed required by the access request with respect to the first execution environment.

14. The method of claim 13, wherein:
   the access request further includes register address information, the register address information being used to indicate an address of a register in the first buffer unit, the register being used to register cryptographic algorithm information, the cryptographic algorithm information including an address of object data and attribute information of a cryptographic algorithm of the object data, and the object data being data for the cryptographic algorithm; and
   based on the required data, instructing the cryptographic engine to execute the cryptographic algorithm that needs to be executed required by the access request with respect to the first execution environment includes:
      extracting the object data based on the address of the object data and storing the object data in a memory of the first buffer unit, wherein the address of the object data is determined by the register address information; and
      instructing the cryptographic engine to perform the cryptographic algorithm that needs to be executed with respect to the first execution environment on the object data based on the attribute information of the cryptographic algorithm, wherein the attribute information of the cryptographic algorithm is determined by the register address information.

15. The method to claim 12, wherein the identification information includes one of:
   an identifier of the first execution environment;
   source address information of the access request, the source address information corresponding to the first execution environment; and
   an identifier of the access request, the identifier of the access request corresponding to the first execution environment.

16. The method of claim 12, further comprising, in response to N being greater than 1:
   receiving a plurality of access requests from the number N execution environments; and
   responding to one access request of the plurality of access requests and instructing the cryptographic engine to execute the cryptographic algorithm with respect to one of the number N execution environments according to the identification information carried in the access request.

17. The method of claim 16, wherein:
   a controller stores priorities corresponding to the number N execution environments; and
   responding to the one access request of the plurality of access requests includes:
      first responding to an access request from an execution environment having a highest priority based on the priorities.

18. The method of claim 16, wherein:
   the plurality of access requests include a first access request from the first execution environment, and a second access request from a second execution environment, a priority of the first execution environment being higher than a priority of the second execution environment; and
   responding to the one access request of the plurality of access requests includes:
      determining whether an execution of the cryptographic algorithm that needs to be executed required by the first access request is completed; and
      in response to the execution of the cryptographic algorithm of the first access request being completed, responding to the second access request to execute a cryptographic algorithm that needs to be executed required by the second access request by the cryptographic engine.

19. The method of claim 16, wherein:
   the plurality of access requests include a first access request from the first execution environment and a second access request from a second execution environment, a priority of the first execution environment being lower than the second execution environment; and responding to the one access request of the plurality of access requests includes:
  determining whether an intermediate cryptography operation result obtained by the first access request is stored; and
  in response to the intermediate cryptography operation result being stored, responding to the second access request to execute the cryptographic algorithm that needs to be executed required by the second access request through the cryptographic engine.

20. An electronic device comprising:
a memory for storing an instruction;
a processor coupled with the memory and, when the instruction being executed, configured to:
  receive an access request from a first execution environment, the access request accessing a cryptographic engine to execute the cryptographic algorithm, the access request including at least identification information, the identification information indicating that the access request is from the first execution environment, the first execution environment being an execution environment of a number N execution environments, and N being an integer greater than 1, and access requests from different execution environments requiring execution of different cryptographic algorithms; and
  based on the identification information, instruct the cryptographic engine to execute the cryptographic algorithm that needs to be executed required by the access request with respect to the first execution environment.

* * * * *